(12) United States Patent
Nozawa

(10) Patent No.: US 8,248,504 B2
(45) Date of Patent: Aug. 21, 2012

(54) IMAGE DISPLAY DEVICE AND IMAGE DISPLAY METHOD

(75) Inventor: Kazuhiro Nozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 12/762,679

(22) Filed: Apr. 19, 2010

(65) Prior Publication Data

US 2010/0295983 A1 Nov. 25, 2010

(30) Foreign Application Priority Data

May 20, 2009 (JP) ................................. 2009-122087

(51) Int. Cl.
*H04N 5/222* (2006.01)
*G09G 5/00* (2006.01)

(52) U.S. Cl. .................................. 348/333.06; 345/659

(58) Field of Classification Search ............. 348/333.01, 348/333.02, 333.04, 333.05, 333.06, 333.12; 345/659

See application file for complete search history.

(56) References Cited

U.S. PATENT DOCUMENTS

| | | | | |
|---|---|---|---|---|
| 7,190,968 B2* | 3/2007 | Nakamura | ................. | 455/550.1 |
| 7,283,854 B2* | 10/2007 | Sato et al. | .................. | 455/575.3 |
| 7,375,755 B2* | 5/2008 | Oya et al. | ................. | 348/333.02 |
| 8,018,517 B2* | 9/2011 | Sato | ......................... | 348/333.02 |
| 2003/0231254 A1* | 12/2003 | Yoneyama et al. | ...... | 348/333.01 |
| 2006/0215052 A1* | 9/2006 | Nagaoka et al. | ......... | 348/333.06 |
| 2008/0225156 A1* | 9/2008 | Kim | ........................ | 348/333.06 |
| 2009/0295975 A1* | 12/2009 | Takahashi et al. | ....... | 348/333.01 |

FOREIGN PATENT DOCUMENTS

JP 2006-121734 5/2006

* cited by examiner

*Primary Examiner* — Albert Cutler
(74) *Attorney, Agent, or Firm* — Oblon, Spivak, McClelland, Maier & Neustadt, L.L.P.

(57) ABSTRACT

An image display device includes first and second image display units that display images, a video signal processing unit that executes a predetermined signal processing, a scanning direction instructing unit that instructs the second image display unit to execute a scanning, first and second color specifying units that specify a color of a graphics image, first and second position specifying units that specify a position of the graphics image to be synthesized, a first synthesizing unit that outputs a signal obtained by synthesizing a signal of a color stored when the first color specifying unit specifies a color with the video signal input from the video signal processing unit, and a second synthesizing unit that outputs a signal obtained by synthesizing a signal of a color stored when the second color specifying unit specifies a color with the video signal input from the video signal processing unit.

7 Claims, 17 Drawing Sheets

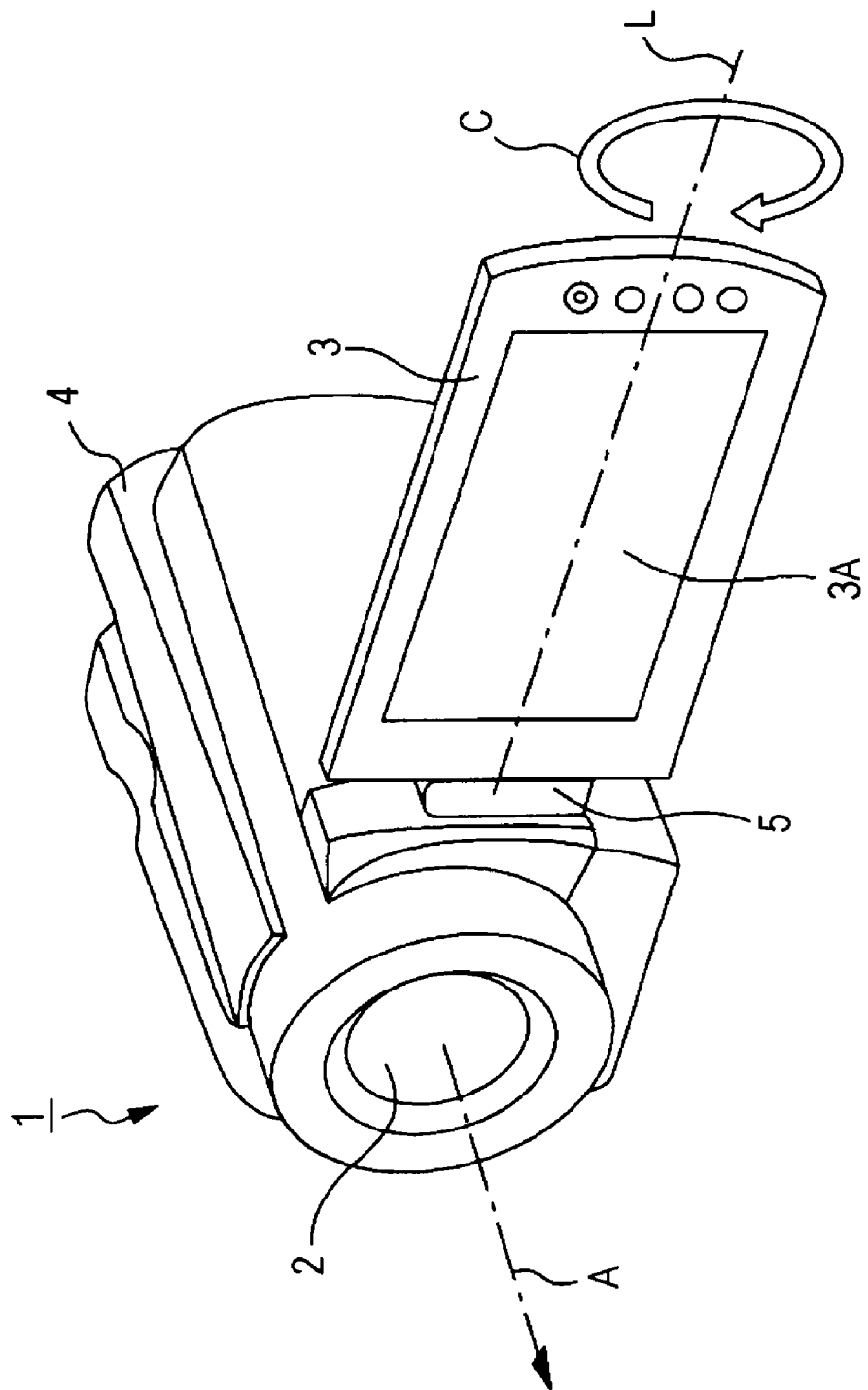

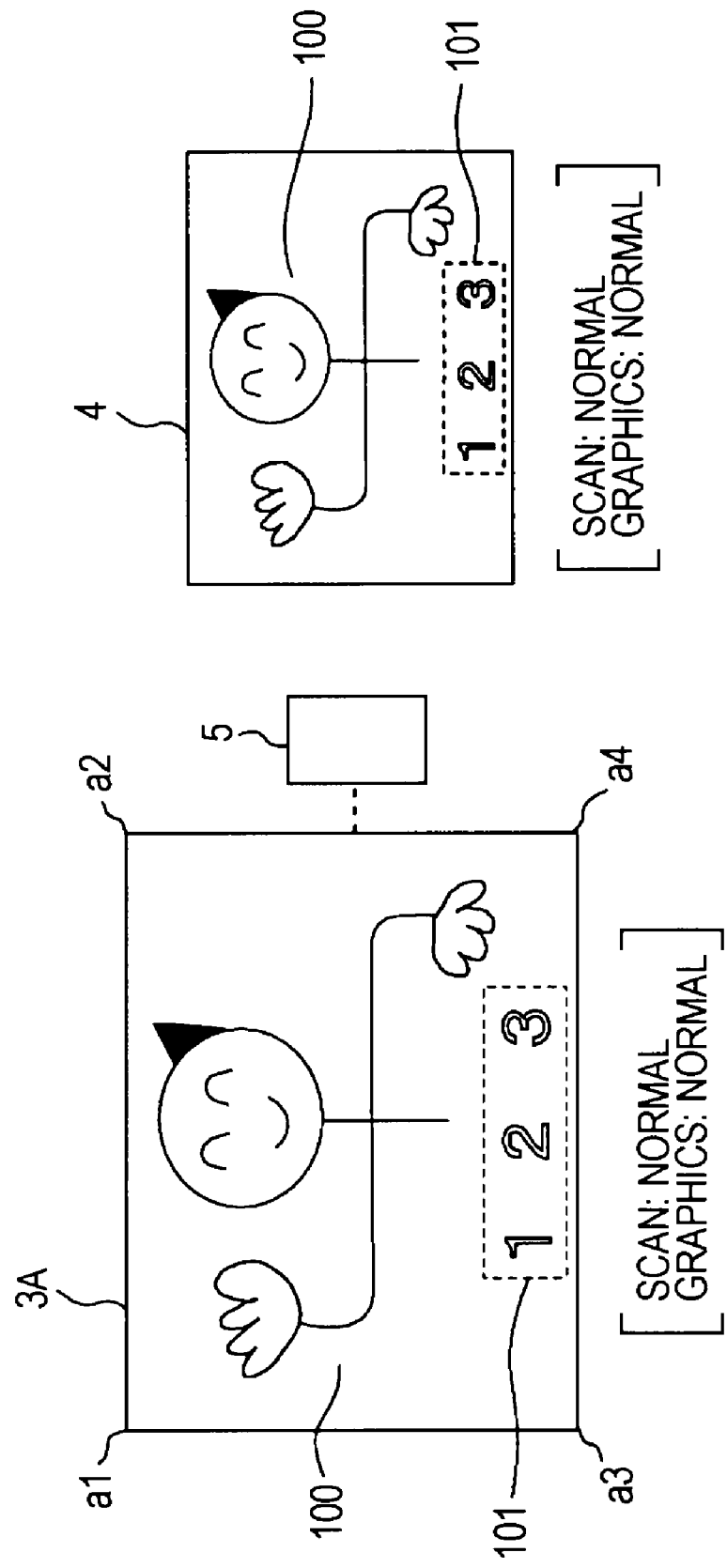

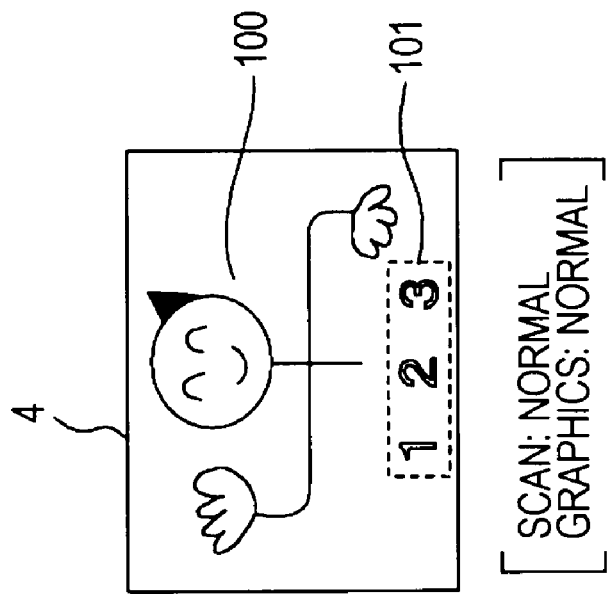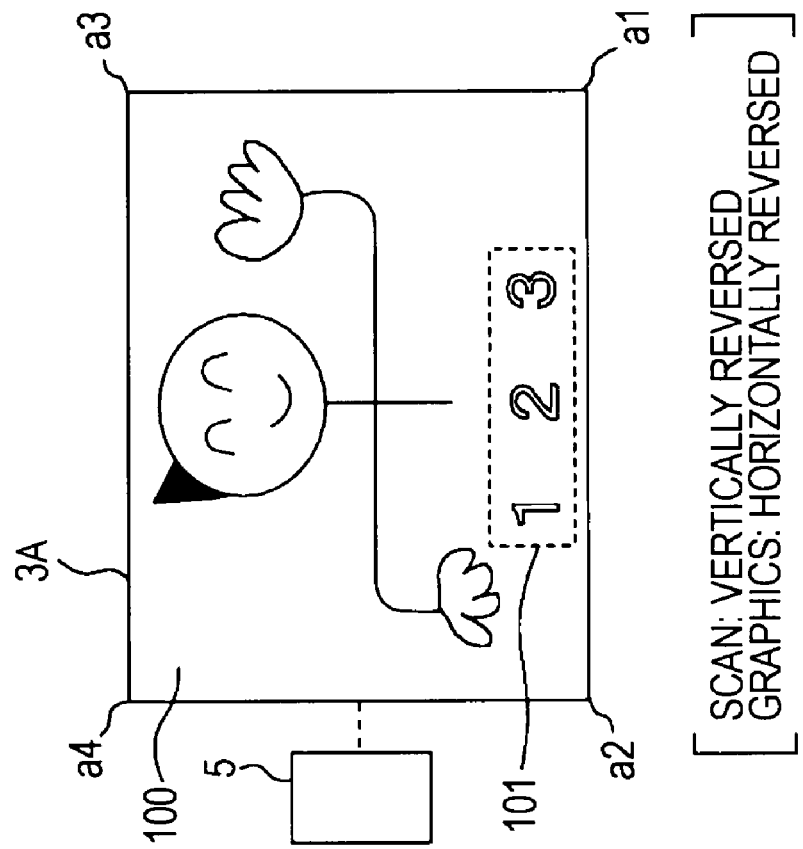

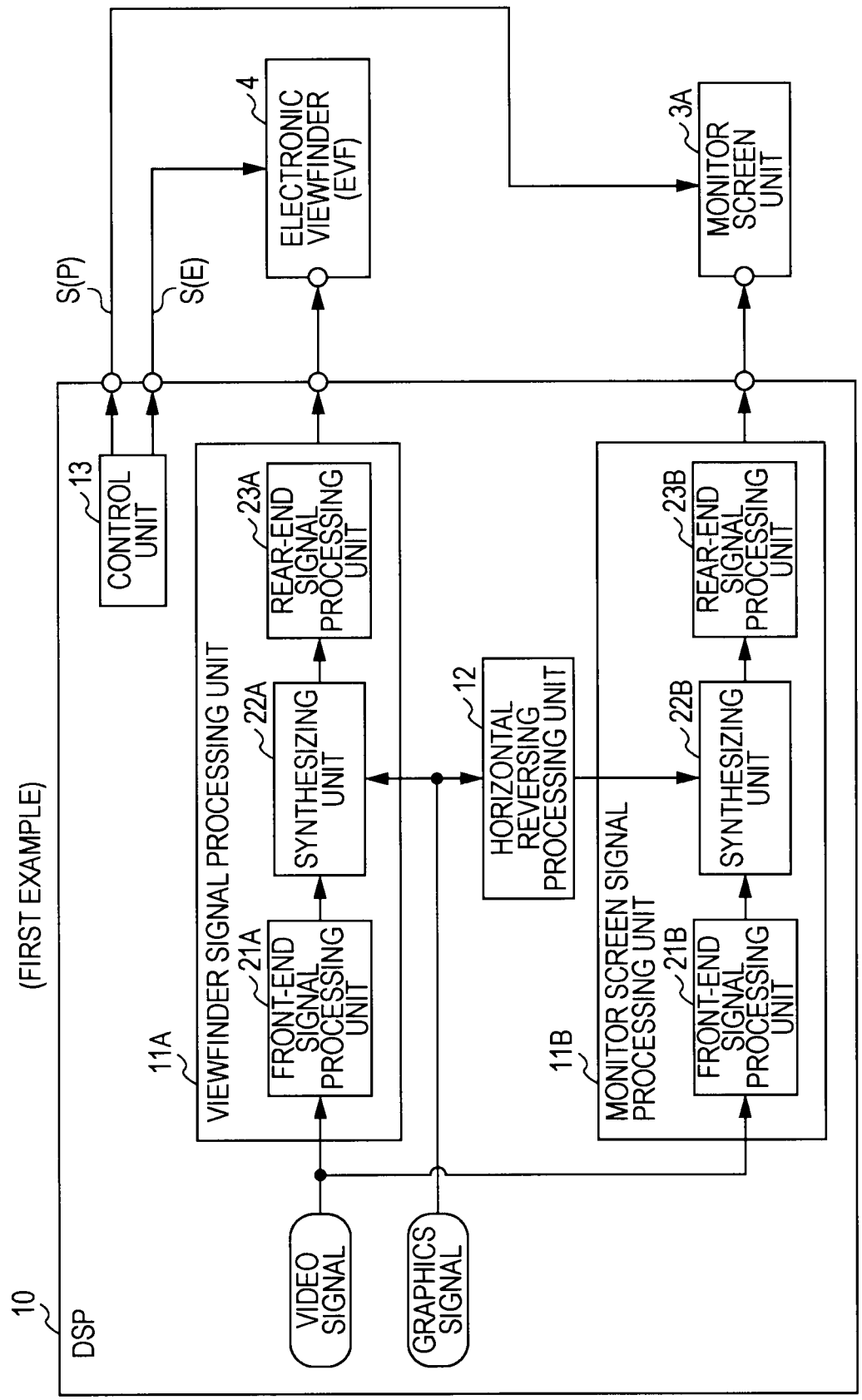

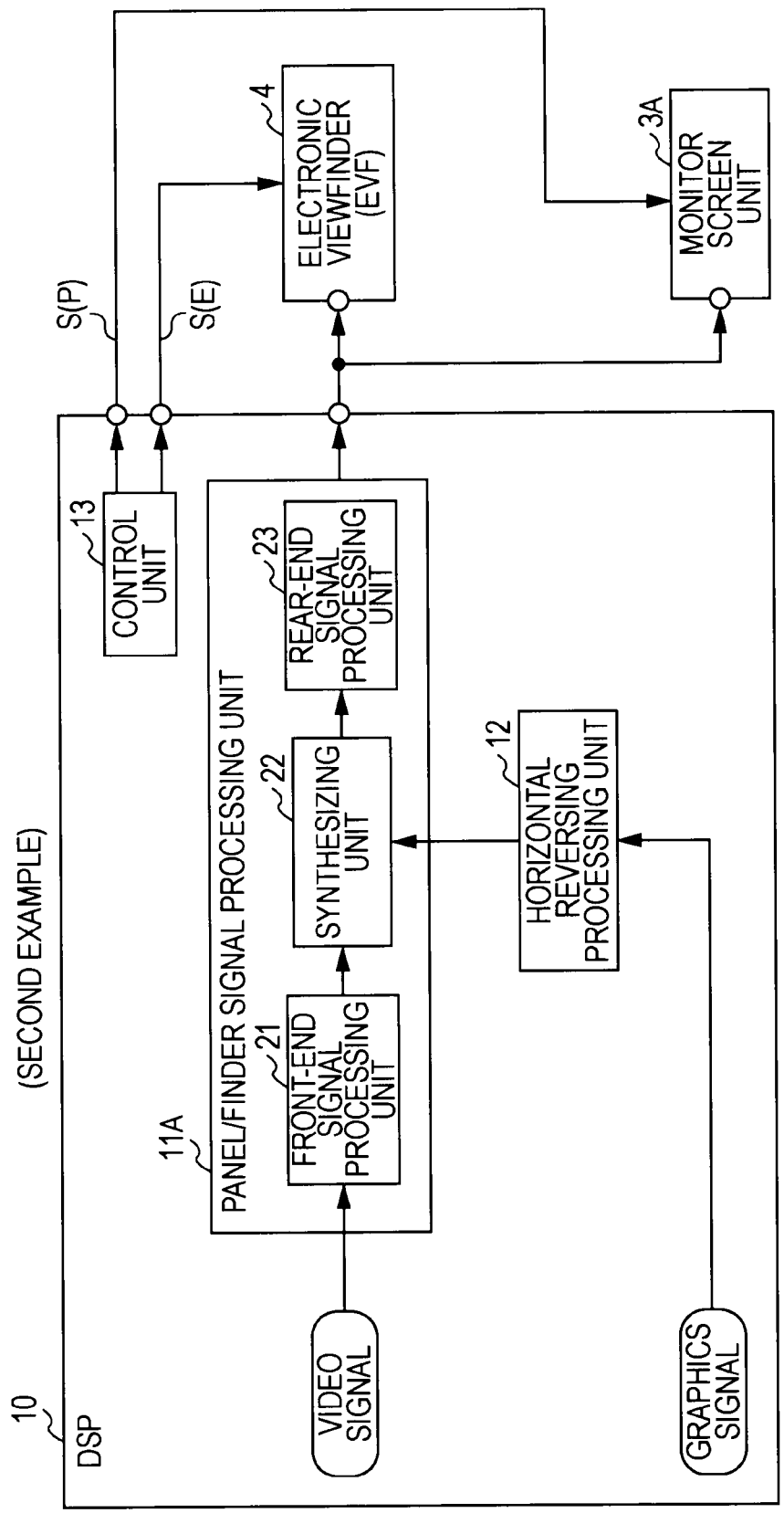

[SCAN: VERTICALLY REVERSED
GRAPHICS: HORIZONTALLY REVERSED]

[SCAN: NORMAL
GRAPHICS: REVERSING LEFT AND RIGHT]

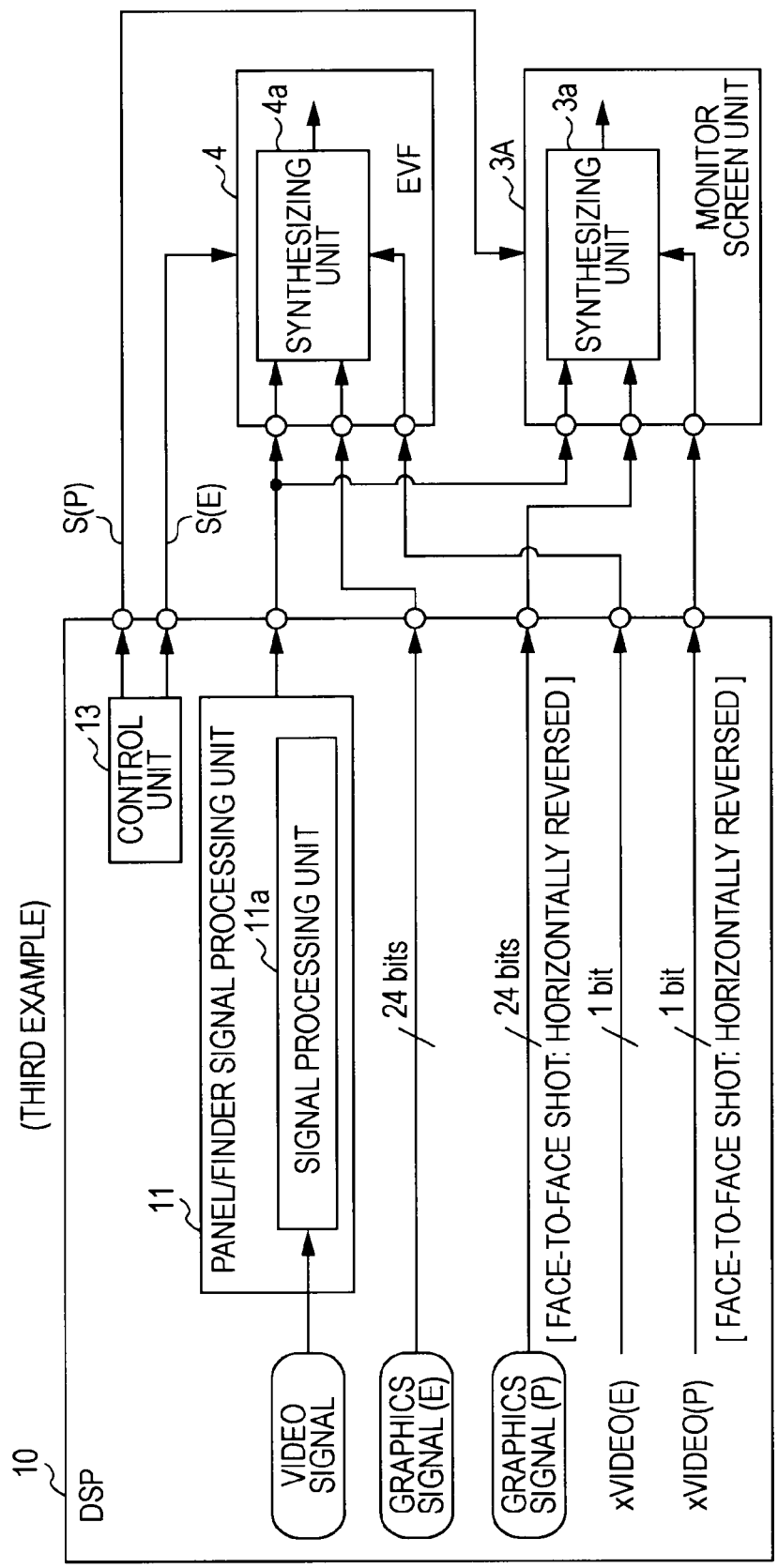

IMAGE DISPLAY DEVICE AND IMAGE DISPLAY METHOD

BACKGROUND OF THE INVENTION

1. Field of the Invention

The present invention relates to an image display device and a method thereof by which an image is displayed on an electronic viewfinder and a monitor panel provided in an image capturing device such as a video camera.

2. Description of the Related Art

A portable video camera device having both a viewfinder and a monitor panel is widely known in the art.

The viewfinder is used to see an image captured by a lens optical system, and typically, provided in an opposite side to the capture direction of the lens optical system. As such a viewfinder, an electronic viewfinder (EVF) is usually employed in consumer electronic appliances. The electronic viewfinder is made from, for example, a liquid crystal display device to display an image signal as a moving picture by receiving image capturing light obtained by the lens optical system using an imaging element.

For example, in the case of real-time display, the monitor panel is made from a liquid crystal display panel having a size of approximately 3 inches and configured to display the image (monitor image) captured in the current time on the display screen. In addition, the monitor panel is configured to display an index window for listing thumbnail images on the captured and recorded images or a GUI window for displaying graphics of various kinds of manipulations, instructions, or notifications.

In addition, a monitor panel having a display screen unit capable of changing its orientation using a movable installation mechanism is widely used. Such a movable monitor panel can be oriented to the same direction as the capturing direction of the lens optical system by reversing the orientation thereof with respect to the movable mechanism as a rotation axis. In this case, it is possible to make it easier to perform a so-called face-to-face shot or self-shot by displaying the monitor image on the monitor panel. That is, a camera operator can make a shot or recording of himself as a target object while checking himself or herself on the monitor image.

In this manner, when the display screen unit of the monitor panel is oriented to the capturing direction for the purpose of the face-to-face shot, for example, the display screen unit is reversed using the movable mechanism as a rotation axis. Therefore, if the monitor image is displayed as it is in the case of the face-to-face shot, a reversed image is displayed (for example, vertically reversed). Therefore, in the case of the face-to-face shot (i.e., when the display screen unit of the monitor panel is oriented in the capturing direction), the monitor image is corrected, for example, by vertically reversing the image scanned for display.

Japanese Unexamined Patent Application Publication No. 2006-121734 is an example of the related art.

SUMMARY OF THE INVENTION

Both image display units of the electronic viewfinder and the monitor panel are constructed such that an orientation of one of them can be reversed while displaying the same image. It is desirable to display a properly-recognized image on a plurality of image display units provided in an electronic device by employing a simple and easy configuration for as long as possible.

According to an embodiment of the invention, there is provided an image display device including: a first image display unit that is provided not to reverse a display direction and displays an image by receiving a first display video signal and executing a scanning; a second image display unit that is provided to change a display direction to a first display direction and a second display direction which is a reversed direction to the first display direction and displays an image by receiving a second display video signal and performing a scanning; a video signal processing means that executes a predetermined signal processing for the video signal obtained based on a captured image; a scanning direction instructing means that instructs the second image display unit to execute a normal scanning in a first state corresponding to the first display direction and execute a reversed scanning by reversing a corresponding scanning direction to a movement direction of the second image display unit to reverse an image from the first display direction to the second display direction in a second state corresponding to the second display direction; a first color specifying means that specifies a color of a graphics image corresponding to the first image display unit; a second color specifying means that specifies a color of a graphics image corresponding to the second image display unit; a first position specifying means that specifies a position of the graphics image to be synthesized with an image of the video signal corresponding to the first image display unit; a second position specifying means that specifies a position of the graphics image to be synthesized with an image of the video signal corresponding to the second image display unit in such a way that a normal position is specified without horizontal reversing in the first state and a reversed position is specified by horizontally reversing in the second state; a first synthesizing means that outputs, as the first display video signal, a signal obtained by synthesizing a signal of a color stored when the first color specifying means specifies a color with the video signal input from the video signal processing means at a position specified by the first position specifying means; and a second synthesizing means that outputs, as the second display video signal, a signal obtained by synthesizing a signal of a color stored when the second color specifying means specifies a color with the video signal input from the video signal processing means at a position specified by the second position specifying means.

This configuration is provided with the first image display unit in which the display direction is not reversed and the second display unit in which the display direction is reversed. The display video signals input to the first and second image display units are based on the video signals from the same signal processing unit. That is, a single video signal processing system is shared by a plurality of image display units.

Furthermore, for each of the first and second image display units, there is independently provided a configuration for outputting, as the first display image signal and the second display video signal, a signal obtained by storing the color signal specified as the graphics image and synthesizing the color signal with the video signal from the signal processing means in response to the instruction of the synthesis position of the graphics image.

In the second state in which the display direction of the second image display unit is opposite to that of the first image display unit, the scanning direction of the second display screen unit is reversed according to the reversing movement direction, and the horizontally reversed position is specified for the graphics image to be displayed on the second image display unit.

As a result, according to an embodiment of the invention, since the video signal processing system is shared by a plurality of image display units, it is possible to display an image overlapped with the graphics image in an appropriate direction on the first and second image display units even when the display direction of the second image display unit is reversed. At this moment, according to an embodiment of the invention, a configuration for independently synthesizing the video signal (graphics signal) itself of the graphics image for each of the first and second image display units is not employed. As described above, the graphics image is overlapped through a control operation for specifying the color of the graphics image and the display position of the graphics image.

In this manner, according to an embodiment of the invention, the video signal processing system can be shared by a plurality of image display units. In addition, it is possible readily to limit the number of pins necessary to transmit the graphics signal to a practical range, for example, during integration. As a result, it is possible to reduce, for example, cost and size and to improve freedom in component integration.

BRIEF DESCRIPTION OF THE DRAWINGS

FIG. 3 illustrates an exemplary appearance of a video camera device according to an embodiment of the invention as seen obliquely from the front side while the movable monitor panel is opened in an orientation corresponding to a face-to-face shot.

FIGS. 4A and 4B illustrate exemplary display situations of the monitor screen unit and the electronic viewfinder when the monitor image obtained by synthesizing the graphics image is displayed by a display processing control corresponding to the normal shot.

FIGS. 6A and 6B illustrate exemplary display situations of the monitor screen unit and the electronic viewfinder when the monitor image obtained by synthesizing the graphics image is displayed by a display processing control corresponding to the face-to-face shot.

FIG. 7 is a block diagram illustrating a first example of the configuration for the monitor image display processing control.

FIG. 8 is a block diagram illustrating a second example of the configuration for the monitor image display processing control.

FIG. 11 is a block diagram illustrating a third example of the configuration for the monitor image display processing control.

DESCRIPTION OF THE PREFERRED EMBODIMENTS

Hereinafter, embodiments of the present invention will be described in the following sequence.

1. Exterior Configuration of Video Camera Device
2. Monitor Screen Unit Display/Electronic Viewfinder Display in case of Face-to-face Shot
3. Configuration for Monitor Image Display Processing Control (First Example)
4. Configuration for Monitor Image Display Processing Control (Second Example)
5. Configuration for Monitor Image Display Processing Control (Third Example)
6. Configuration for Monitor Image Display Processing Control (Fourth Example): Embodiment
  6-1. Fundamental Configuration According to Embodiment
  6-2. Modification 1
  6-3. Modification 2

1. Exterior Configuration of Video Camera Device

Figure 1:
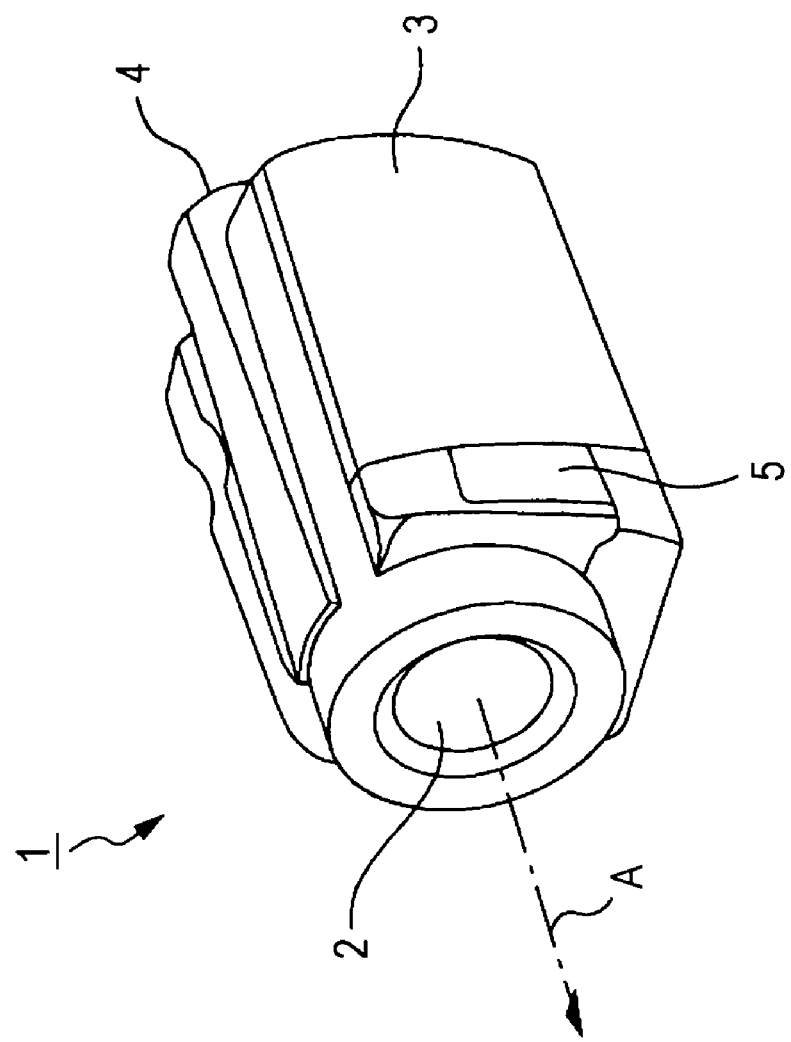
FIG. 1 illustrates an exemplary appearance of a video camera device according to an embodiment of the invention as seen obliquely from the front side while the movable monitor panel is closed.
Figure 2:
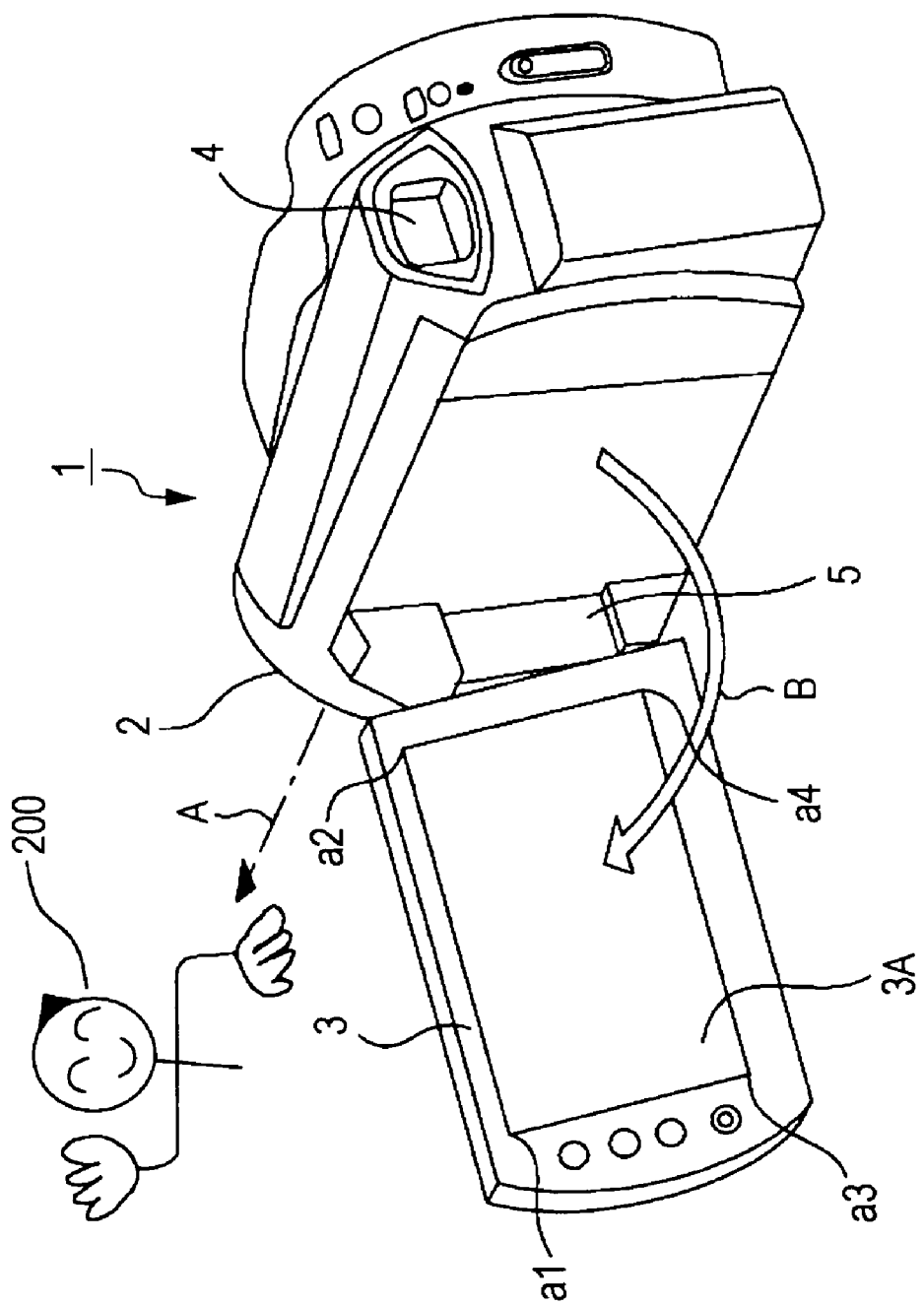
FIG. 2 illustrates an exemplary appearance of a video camera device according to an embodiment of the invention as seen obliquely from the rear side while the movable monitor panel is opened in an orientation corresponding to a normal shot.

FIGS. 1 to 3 are perspective diagrams illustrating exemplary appearances of a video camera device 1 having a configuration of a display device according to an embodiment of the invention.

FIG. 1 illustrates a video camera device 1 as seen obliquely from the front side while the movable monitor panel 3 is closed.

FIG. 2 illustrates a video camera device 1 as seen obliquely from the rear side while the movable monitor panel 3 is opened in an orientation corresponding to a normal shot.

FIG. 3 illustrates a video camera device 1 as seen obliquely from the front side while the movable monitor panel 3 is opened in an orientation corresponding to a face-to-face shot.

The video camera devices 1 illustrated in these drawings include a so-called horizontal casing as a whole as shown in the drawings.

In the front side of this casing, a capturing lens unit 2 is provided as shown in the drawing. The capture lens unit 2 is to receive the incident light as the capture light, and in practice, includes a necessary number of lenses, a diaphragm, a zoom mechanism, or the like. The arrow shown in the drawing denotes a direction corresponding to the optical axis of the capture lens unit 2, where the capture lens unit 2 captures an image (i.e., the capture direction A). That is, objects within a capture view field defined by the angle of view of the lens with respect to this capture direction A are captured.

For example, when a user as a camera operator tries to capture a person as a target object, i.e., a capture target 200 as shown in FIG. 2, the video camera device 1 is disposed such that the capture direction A is oriented to the capture target 200.

In this video camera device 1, a movable monitor panel 3 is provided in the right side of the mainframe as seen in the front.

For example, the movable monitor panel 3 includes a display device as a monitor having a size of approximately 3 inches and is movably installed in the mainframe by the movable mechanism 5. A display device that can be employed in the movable monitor panel 3 includes, for example, a liquid crystal display device.

In a capture mode capable of recording the captured image, the monitor image can be displayed on the monitor screen unit 3A (i.e., the second image display unit) corresponding to a display screen unit of the display device provided in this movable monitor panel 3. That is, the image being captured at that moment can be displayed as a moving picture in a real-time manner. A user can capture an image while seeing this monitor image.

Since the monitor screen unit 3A of the movable monitor panel 3 is provided with, for example, a display screen size larger than the electronic viewfinder 4 as will be described later, it advantageously has a larger size than that of the monitor image and is easy to see. For example, since the movable monitor panel 3 can move to adjust an angle in both the upward and downward directions, it is possible to increase freedom in a shot angle.

On the monitor screen unit 3A, an image for reproducing the capture image data recorded in an internal recording medium of the video camera device 1 can also be displayed.

The monitor screen unit 3A also functions as a main screen for the GUI. For example, a list of scenes recorded in the internal recording medium (i.e., the capture image data) can be displayed, for example, as illustrations where thumbnail images are arranged.

A manipulation menu window for various setup operations or the like can be displayed as well.

For example, images regarding the GUI such as icons or characters including an operation condition, a setup condition, a manipulation button, or the like can also be overlapped with a main image including a monitor image or a reproduction image.

For example, while the reproduction image or the monitor image obtained by the image capturing may be different before and after the recording, it is displayed based on the video signal originally obtained by the image capturing. On the contrary, for example, the image relating to the GUI is not based on the image capturing, but on image data generated inside the video camera device 1 by a graphics processing function, a so-called OSD (On Screen Display).

The electronic viewfinder 4 (EVF: Electronic View Finder) (the first display screen unit) is a portion where the captured image (the monitor image) at that moment in the case of a shot mode is displayed, and particularly, as recognized from FIG. 2, provided in the rear side of the video camera device 1.

The electronic viewfinder 4 may not be based on the optical structure, but, for example, a display device such as a liquid crystal.

The captured light obtained by performing the capturing using the capture lens unit 2 is received by the capturing element such as CCD or CMOS and converted into an electric signal. Based on this electric signal, a video signal of a moving picture as the captured image is generated. In the image capturing mode, the video signal of the captured image is also output to the electronic viewfinder 4 and reproduced and displayed as a moving picture in the corresponding display device. As a result, the monitor image is displayed in the electronic viewfinder 4.

The electronic viewfinder is advantageous in that any complicated optical system is dispensable, and the image can be captured as it is displayed thereon with low cost.

For example, if the operator normally grasps a camera to make a shot by orienting the capturing direction and the operator's view direction to the same direction (in a normal shot), the operator can recognize image contents being captured at that time by seeing the electronic viewfinder 4.

Next, how to move the movable monitor panel 3 in the video camera device 1 and use examples of the capturing according to that direction will be described.

When the movable monitor panel unit 3 is closed with respect to the mainframe as shown in FIG. 1, the monitor screen unit 3A is configured not to be exposed to the outside from the mainframe.

For example, from this state, if the movable monitor panel unit 3 is opened by rotating it in a horizontal direction with respect to the movement axis of the movable mechanism 5 as shown by the arrow B in FIG. 2, the monitor screen unit 3A is directed to the rear side of the mainframe so that the operator can see it. If the operator normally grasps a camera to make a shot by orienting the capturing direction and the operator's view direction to the same direction (in a normal shot), the operator can see the monitor image displayed on the monitor screen unit 3A and recognize the contents by disposing the movable monitor panel unit 3 as shown in FIG. 2.

From the state shown in FIG. 2, the movable monitor panel 3 according to an embodiment of the invention can be moved by rotating the movable monitor panel 3 itself in a vertical direction as shown by the arrow C (or a reverse direction of the arrow C) with respect to the movement axis of the horizontal direction of the movable mechanism 5 as a rotation center (denoted by the one-dotted dashed line L in FIG. 3). As a result, as shown in FIG. 3, the direction of the monitor screen unit 3A of the movable monitor panel 3 (i.e., the display direction) can be reversed to face the same direction as the capturing direction A.

If the monitor image is displayed on the monitor screen unit 3A in the image capturing mode while the movable monitor panel 3 is directed as shown in FIG. 3 (in the display direction), a so-called face-to-face shot (automatic shot) can be readily performed.

That is, in the case of the face-to-face shot, for example, the operator faces the video camera device 1 by orienting the capturing direction A towards himself/herself. At this moment, if the monitor image is displayed by orienting the direction of the movable monitor panel 3 to the front side as shown in FIG. 3, the operator can make a shot recording while identifying the contents of the image being captured.

2. Monitor Screen Unit Display/Electronic Viewfinder Display in case of Face-to-face Shot However, for example, in order to change the direction of the movable monitor panel unit 3 (the monitor screen unit 3A) of FIG. 2 (a first display direction or a first state) to the direction of FIG. 3 (a second display direction or a second state), the direction thereof is reversed by rotating the movable monitor panel unit 3 as described above. Therefore, if the same image as that of the normal shot corresponding to FIG. 2 is displayed in the case of the face-to-face shot of FIG. 3, the monitor image is reversed vertically. Therefore, it may be necessary to reverse display conditions of the monitor screen unit 3A between the normal shot of FIG. 2 and the face-to-face shot of FIG. 3.

In a case where the video camera device 1 includes both the viewfinder and the movable monitor panel unit, when the movable monitor panel unit is closed as the monitor image is displayed in the case of the image capturing mode, the monitor image may be displayed only by the viewfinder. This is because the user is not allowed to see the monitor screen unit while the movable monitor panel unit is closed.

However, in a case where the movable monitor panel unit is opened, two conditions may be considered.

As one of the conditions, it may be possible that the monitor image is displayed on only the movable monitor panel unit while the viewfinder is turned off. Generally, if the operator sees the monitor image displayed on the movable monitor panel 3 in the state that the movable monitor panel 3 is opened in the image capturing mode, the operator can recognize the contents of the captured image better, and particularly, the image displayed on the movable monitor panel 3 is large and easy to see unless a bad condition such as external light interference exists. Therefore, it may do not matter whether the viewfinder is turned off.

As the other condition, it may be possible that the monitor image is displayed on both the movable monitor panel unit and the viewfinder at the same time. Advantageously, for example, when it is difficult to see the screen on the movable monitor panel unit due to a strong external light interference, the user may directly see the viewfinder as necessary.

The video camera device 1 according to an embodiment of the invention employs a function that the monitor image is displayed on both the movable monitor panel unit 3 and the viewfinder at the same time. In other words, in the case of the shot mode, the monitor image is simultaneously displayed on the electronic viewfinder 4 and the monitor screen unit 3A of the movable monitor panel unit 3. Furthermore, according to an embodiment of the invention, in order to overlappingly display the image for the graphics processing regarding the GUI described above together with the monitor image, these graphics images are also simultaneously displayed on both the monitor screen unit 3A and the electronic viewfinder 4.

Now, a description will be made about how to overlappingly display or draw the graphics image and the monitor image on the monitor screen unit 3A in the states shown in FIGS. 2 and 3, on the assumption that the monitor image is simultaneously displayed on both the monitor screen unit 3A and the electronic viewfinder 4 as described above, in association with the image display state from the side of the electronic viewfinder 4.

Hereinafter, the "case of a normal shot" means a state (a first state) that the movable mechanism 5 supports the movable monitor panel unit 3 by orienting the monitor screen unit 3A to the direction reversed to the capturing direction A (the same display direction as that of the electronic viewfinder 4) as shown in FIG. 2 when the shot mode is set, and the monitor image is to be displayed.

In addition, the "case of a face-to-face shot" means a state (a second state) that the movable mechanism 5 supports the movable monitor panel unit 3 by orienting the monitor screen unit 3A to the same direction as the capturing direction A as shown in FIG. 3 when the shot mode is similarly set, and the monitor image is to be displayed.

FIGS. 4A and 4B illustrates display conditions of the monitor image on the monitor screen unit 3A and the electronic viewfinder 4, respectively, to be executed in the case of the normal shot.

Here, the monitor screen unit 3A shown in FIG. 4A corresponds to the case where the movable monitor panel unit 3 is opened in the state shown in FIG. 2. In the drawing, the upper left vertex angle, the upper right vertex angle, the lower left vertex angle, and the lower right vertex angle of the rectangular monitor screen unit 3A are represented by reference numerals a1, a2, a3, and a4, respectively. In addition, in order to express the location relationship between the vertex angles a1, a2, a3, and a4 of the monitor screen unit 3A and the mainframe side of the video camera device 1, movable mechanism 5 is schematically illustrated. Also in FIG. 1 described earlier, the relationship among the movable monitor panel unit 3, the mainframe of the video camera device 1, and the vertex angles a1, a2, a3, and a4 are more clearly illustrated.

In the present embodiment, the direction of the monitor screen unit 3A corresponding to the normal shot of FIG. 2 is set to a normal position state as a reference.

Furthermore, in the case of the normal shot, it is assumed that the capture target 200 is being captured as shown in FIG. 2. In this case, the monitor screen unit 3A performs a typical horizontal scanning (or a vertical scanning). Specifically, the horizontal scanning is performed by driving, for example, the pixel data forming a single horizontal interval in an arrangement sequence from the left side (a1-a3) to the right side (a2-a4) of the monitor screen unit 3A. In addition, the vertical scanning is performed by driving the horizontal lines of every single horizontal interval of the video signal from the top side (a1-a2) to the bottom side (a3-a4) of the monitor screen unit 3A.

As a result, the monitor image 100 is appropriately displayed like the real shot target 200 in all the left, right, top, and bottom sides as shown in FIG. 4A.

In the case of the normal shot, the graphics signal of the graphics image overlapped with the monitor image 100 may be normally synthesized with the video signal of the monitor image without particularly reversing vertically or horizontally. As shown in FIG. 4A, the graphics image 101 is also displayed in an appropriate position and direction. While the graphics image 101 of this drawing is just schematically illustrated, the alphanumeric characters 1, 2, and 3 are lined in a horizontal direction and located in the lower side of the monitor screen unit 3A near the center.

As a result, in the case of the normal shot, the monitor image 100 is displayed in an appropriate direction on the monitor screen unit 3A by normally scanning the video signal of the monitor image 100 and normally overlapping the graphics signal with the video signal, and the graphics image 101 is also displayed in an appropriate direction and position.

At this moment, similar to the monitor screen unit 3A, the electronic viewfinder 4 normally scans the video signal of the monitor image and normally overlaps the graphic signal with the video signal. As a result, as shown in FIG. 4B, the monitor image 100 is displayed in an appropriate direction on the electronic viewfinder 4, and the graphics image 101 is also displayed in an appropriate direction and position.

Similar to the monitor screen unit 3A, the electronic viewfinder 4 is not movable to reverse its direction (i.e., the display direction) (however, it may be movable within a predetermined angle range that does not look like reversion). Therefore, regardless of whether the direction of the monitor screen unit 3A in the image capturing mode is set to the normal shot position or the face-to-face shot position, a normal scanning and a normal graphics signal synthesis processing are to be performed for the electronic viewfinder 4.

Next, the image display condition in the case of the face-to-face shot of FIG. 3 will be described.

In order to orient the monitor screen unit 3A in the direction shown in FIG. 3, the movable monitor panel 3 is rotated to reverse the display direction with respect to the rotation axis of the horizontal direction of the movable mechanism 5. Therefore, in the case of the face-to-face shot, as the monitor screen unit 3A is seen from the front side of the video camera device 1, the vertex angle a4 becomes the upper left vertex angle, the vertex angle a3 becomes the upper right vertex angle, the vertex angle a2 becomes the lower left vertex angle, and the vertex angle a1 becomes the lower right vertex angle as shown in FIG. 5A.

In addition, in the state of the face-to-face shot, it is assumed that the graphics signal is normally synthesized by performing a normal scanning for the monitor screen unit 3A using the same method as the normal shot of FIG. 4. At this moment, since the face-to-face shot is performed, the image displayed on the monitor screen unit 3A is seen as shown in FIG. 5A to the operator who sees the monitor screen unit 3A from the front side of the video camera device 1.

In other words, the monitor image is vertically reversed, and the graphics image 101 is vertically and horizontally reversed.

In this regard, first, in the case of the face-to-face shot, the image is vertically reversed for the scanning of the monitor screen unit 3A in comparison with a normal case. That is, horizontal lines are driven from the side a3-a4 to the side a1-a2 of the monitor screen unit 3A for every single horizontal interval of the video signal.

As a result, the monitor image 100 is displayed by vertically reversing as shown in FIG. 6A.

It is noted that, in the case of the face-to-face shot, the monitor image 100 is displayed by vertically reversing in comparison with a normal case, and it may be unnecessary to reverse horizontally.

In this case, it is assumed that a shot is made for a person as the shot target 200 shown in FIG. 2. The person of the shot target 200 of FIG. 2 poses by putting his right hand up and putting his left hand down. In the case of the face-to-face shot, the person of the shot target 200 faces the monitor screen unit 3A. Therefore, if the person of the shot target 200 puts his right hand up as described above, the monitor screen unit 3A should correspondingly display an image where the hand positioned in the right side of the targeted person is raised. That is, it is necessary to display the image in a mirror-reflection state.

For this reason, it may be preferable not to reverse horizontally. That is, similar to the normal case, the horizontal scanning is performed such that pixels of a single horizontal line of the video signal are driven from the a1-a3 side to the a2-a4 side.

As recognized from FIG. 5A, the graphics image 101, which should be displayed in the bottom side, is vertically reversed and displayed in the top side. Moreover, the characters of the graphics image 101 are also horizontally reversed.

First, for the case where the display position of the graphics image 101 is vertically reversed, the monitor image 100 is vertically reversed so as to be displayed in an appropriate location in the bottom side of the screen by vertically reversing the scanning of the monitor screen unit 3A as described above.

However, while the graphics image 101 may be positioned in the bottom side of the screen through the processes until now, it still remains in the horizontally reversed state.

In this regard, in the case of the face-to-face shot, the graphics signal is horizontally reversed and synthesized with the video signal. As a result, when the graphics image 101 is overlappingly displayed on the monitor screen unit 3A with the monitor image 100, it can be appropriately displayed without the horizontal reversing as shown in FIG. 6A.

3. Configuration for Monitor Image Display Processing Control (First Example)

As described above, the video camera device 1 according to an embodiment of the invention can overlapping display the monitor image 100 and the graphics image 101 without any error in the case of the shot mode. Additionally, in this case, when the face-to-face shot is performed, in order to reverse vertically the monitor image 100 and to reverse vertically and horizontally the graphics image 101, the scanning of the monitor screen unit 3A is to be vertically reversed, and the graphics signal synthesized with the video signal of the monitor image is to be horizontally reversed.

In addition, the video camera device 1 according to an embodiment of the invention is set simultaneously to display the monitor image 100 where the graphics image 101 is probably overlapped as described above in both the monitor screen unit 3A and the electronic viewfinder. Considering this simultaneous display, in the side of the monitor screen unit 3A, when the normal shot or the face-to-face shot is performed, it is necessary to switch the corresponding process such that the vertical scanning is reversed, and the graphics signal is horizontally reversed. On the contrary, in the electronic viewfinder 4, it is necessary to perform a normal scanning and normally synthesize the graphics signal without horizontal reversing.

Considering the aforementioned fact, an example of the configurations for a signal processing for appropriately performing the monitor image display and display control (i.e., the monitor image display processing control) is shown in FIG. 7 as a first example.

While, hereinafter, a configuration for the monitor image display processing control will be described, it is assumed that a DSP 10 can recognize whether or not the image capturing mode is executed by communicating with, for example, a microcomputer or the like (not shown) outside the DSP 10. In addition, it is assumed that the DSP 10 can recognize which one of the normal shot and the face-to-face shot is executed while the movable monitor panel unit 3 (monitor screen unit 3A) is opened.

For example, the microcomputer can recognize which one of the normal shot and the face-to-face shot the movable monitor panel unit 3 displays based on an output from a switch or a sensor which represents a position state of a predetermined portion where the movable mechanism 5 is provided according to the direction of the movable monitor panel unit 3. When the microcomputer 10 delivers the result of this recognition to the DSP 10, the DSP 10 can also identify in which state, corresponding to the normal shot and the face-to-face shot, the movable monitor panel unit 3 is disposed.

Referring to FIG. 7, the DSP (Digital Signal Processor) 10 is illustrated together with the electronic viewfinder 4 and the monitor screen unit 3A. The image display for the electronic viewfinder 4 and the monitor screen unit 3A is implemented by a video signal processing and the control of the electronic viewfinder 4 and the monitor screen unit 3A in the DSP 10.

In practice, the DSP 10 is configured to implement the signal processing and the control by writing a program (a so-called transaction) and executing the program. In FIG. 7, the signal processing function and the control function implemented by the program are illustrated as block configurations corresponding to each function. Here, the block configuration of the DSP 10 includes a viewfinder signal processing unit 11A, a monitor screen signal processing unit 11B, a horizontal reversing processing unit 12, and a control unit 13.

The viewfinder signal processing unit 11A has a function of processing video signals corresponding to images to be displayed on the electronic viewfinder 4.

The monitor screen signal processing unit 11B has a function of processing video signals corresponding to images to be displayed on the monitor screen unit 3A. In addition, the monitor screen signal processing unit 11B includes a front-end signal processing unit 21B, a synthesizing unit 22B, and a rear-end signal processing unit 23B.

The horizontal reversing processing unit 12 may perform a horizontal reversing processing for the input graphics signals and output the results. In addition, the horizontal reversing processing unit 12 can switch between an operation of the horizontal reversing processing and an operation of normally outputting the input graphics signals without the horizontal reversing processing.

As shown in the drawing, the graphics signals are divided into those input to the horizontal reversing processing unit 12 and those directly input to the viewfinder signal processing unit 11B.

In this case, the control unit 13 controls driving operations of the monitor screen unit 3A and the electronic viewfinder 4. For example, switching between normal scanning, vertically-reversed scanning, and horizontally-reversed scanning of the monitor screen unit 3A is performed by the monitor screen unit 3A in response to the control signal from the control unit 13.

Here, the control signal for the electronic viewfinder 4 from the control unit 13 is represented by S(E), and the control signal for the monitor screen unit 3A is represented by S(P).

First, the video signal of the monitor image 100 obtained based on the captured image is separately input to the viewfinder signal processing unit 11A and the monitor screen signal processing unit 11B.

The viewfinder signal processing unit 11A includes a front-end signal processing unit 21A, a synthesizing unit 22A, and a rear-end signal processing unit 23A. First, the front-end signal processing unit 21A is provided in the initial stage of the viewfinder signal processing unit 11A to execute a video signal processing, for example, for adjusting a color or correcting luminance of the input video signal and output the results to the synthesizing unit 22A.

The synthesizing unit 22A receives the graphics signal and the video signal from the front-end signal processing unit 21A. In addition, the graphics signal contains data on the graphics signal generated by, for example, the OSD function (not shown). The graphics signal input to the synthesizing unit 22A of the electronic viewfinder side does not pass through the horizontal reversing processing unit 12 as shown in the drawing. Therefore, a normal graphics signal is usually input to the synthesizing unit 22A without vertical reversing.

The synthesizing unit 22A synthesizes the graphics signal with the video signal and outputs the results to the rear-end signal processing unit 23A.

The rear-end signal processing unit 23A executes a signal processing necessary for the display, for example, on the electronic viewfinder 4 for the video signal. For example, if necessary, the rear-end signal processing unit 23B performs resolution conversion according to the display screen size of the electronic viewfinder 4. The video signal processed by the rear-end signal processing unit 23B is output to the electronic viewfinder 4 side.

At least, in the image capturing mode, the electronic viewfinder 4 is set to execute a normal scanning by the control unit 13. The graphics signal input to the synthesizing unit 22A of the electronic viewfinder side does not pass through the horizontal reversing processing unit 12 as shown in the drawing. Therefore, the synthesizing unit 22A usually receives a normal graphics signal without horizontal reversing.

Figure 5B:
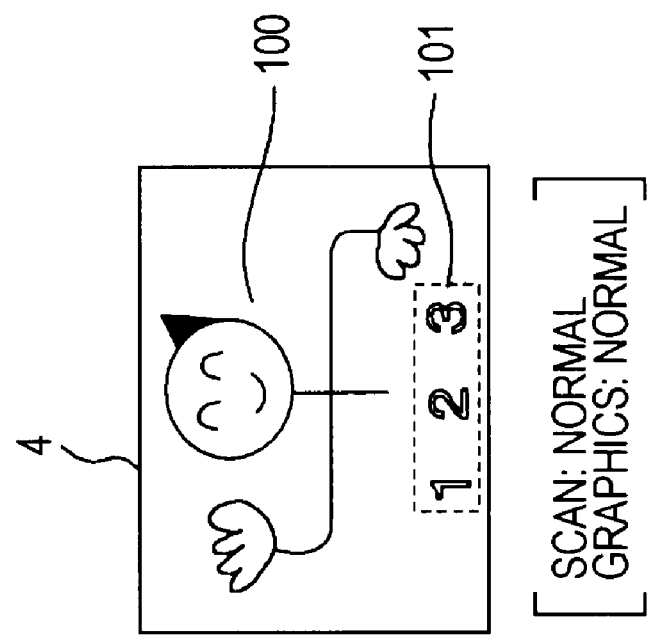
FIGS. 5A and 5B illustrate exemplary display situations of the monitor screen unit and the electronic viewfinder when the monitor image obtained by synthesizing the graphics image is displayed by a display processing control corresponding to the normal shot in the case of the face-to-face shot.
Figure 5A:
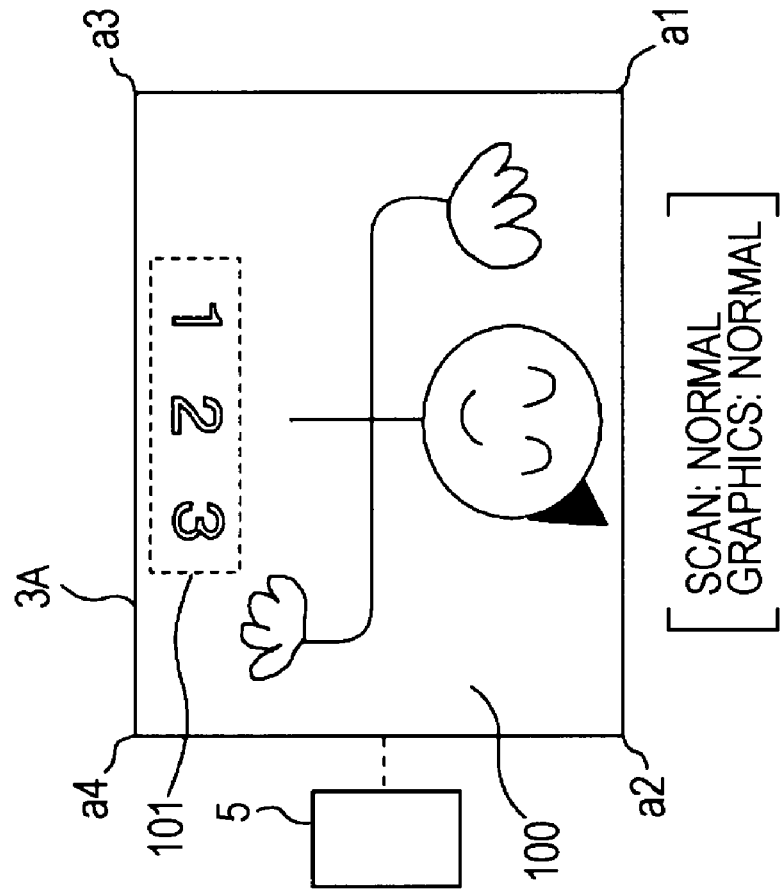

As a result, as described above, in the case of the image capturing mode, the electronic viewfinder 4 appropriately displays the monitor image 100 and the graphics image 101 as shown in FIGS. 4B and 5B regardless of whether the normal shot or the face-to-face shot is performed.

The monitor screen signal processing unit 11B includes a front-end signal processing unit 21B, a synthesizing unit 22B, and a rear-end signal processing unit 23B.

The front-end signal processing unit 21B located in the initial stage of the monitor screen signal processing unit 11B performs a signal processing for the input video signal, for example, as in the front-end signal processing unit 21A of the viewfinder signal processing unit 11B and outputs the results to the synthesizing unit 22B.

The synthesizing unit 22B synthesizes the video signal and the graphics signal from the front-end signal processing unit 21B and outputs the results to the rear-end signal processing unit 23B.

The rear-end signal processing unit 23B executes a signal processing necessary for the display in the monitor screen unit 3A for the input video signal and outputs the results to the monitor screen unit 3A side.

Here, the synthesizing unit 22B also receives the video signal and the graphics signal from the front-end signal processing unit 21B. However, the synthesizing unit 22B receives the graphics signal passing through the horizontal reversing processing unit 12.

The horizontal reversing processing unit 12 normally outputs the input graphics signal to the synthesizing unit 22B without horizontal reversing when the DSP 10 determines that it is the normal shot. On the contrary, when the DSP 10 determines that it is the face-to-face shot, the horizontal reversing processing unit 12 outputs the graphics signal containing image contents horizontally reversed through the horizontal reversing processing to the synthesizing unit 22B.

Furthermore, the monitor screen unit 3A is controlled by the control unit 13 such that a normal scanning is performed in the case of the normal shot, and vertically-reversed scanning is performed in the case of the face-to-face shot.

As a result, the monitor screen unit 3A can appropriately display the monitor image 100 and the graphics image 101 overlapped with the monitor image 100 as shown in FIGS. 4A and 6A in both the cases of the normal shot and the face-to-face shot.

In the configuration shown in FIG. 7, the video signal processing system has two channels for the viewfinder signal processing unit 11A and the monitor screen signal processing unit 11B. This increases a processing load, for example, because resource consumption by the DSP 10 increases accordingly. Therefore, for example, a high performance DSP may be preferably integrated, but this is not proper for the consumer electronic device from the viewpoint of the cost and it is also impractical. Since the viewfinder signal processing unit 11A and the monitor screen signal processing unit 11B have nearly the same signal processing configuration, they have redundancy in this sense. From this point of view, it is preferable that the video signal processing system is much simpler than that shown in FIG. 7.

4. Configuration for Monitor Image Display Processing Control (Second Example)

An example of simplifying the processing of the DSP 10 of FIG. 7 is shown in FIG. 8 as a second example. In FIG. 8, like reference numerals denote like elements as in FIG. 7, and descriptions thereof will be omitted.

The DSP 10 shown in FIG. 8, the viewfinder signal processing unit 11A and the monitor screen signal processing unit 11B shown in FIG. 7 are integrated into a single panel/finder signal processing unit 11. Similar to FIG. 7, the panel/ finder signal processing unit 11 includes the front-end signal processing unit 21, the synthesizing unit 22, and the rear-end signal processing unit 23.

In this case, the video signal that is input to the panel/finder signal processing unit 11 and subjected to the signal processing is separately input to the electronic viewfinder 4 and the monitor screen unit 3A after output from the panel/finder signal processing unit 11.

The graphics signal is input to the synthesizing unit 22 through the horizontal reversing processing unit 12. The operation of the horizontal reversing processing unit 12 is similar to that shown in FIG. 7.

In the configuration shown in FIG. 8, since video signal processing systems for the electronic viewfinder 4 and the monitor screen unit 3A are integrated into a single panel/finder signal processing unit 11, it is possible to reduce resource consumption accordingly.

However, in the configuration shown in the drawing, in the case of the face-to-face shot, it is difficult appropriately to display the monitor image 100 overlapped with the graphics image 101 on both the monitor screen unit 3A and the electronic viewfinder 4.

An example of this issue will be described with reference to FIGS. 9A and 9B, and 10A and 10B.

Here, in the case of the face-to-face shot, it is assumed that the scanning of the monitor screen unit 3A is vertically reversed by the control unit 13, and simultaneously, the processing of the graphics signal is horizontally reversed by the horizontal reversing processing unit 12 as the display processing control of the DSP 10 shown in FIG. 8.

Figure 9A:
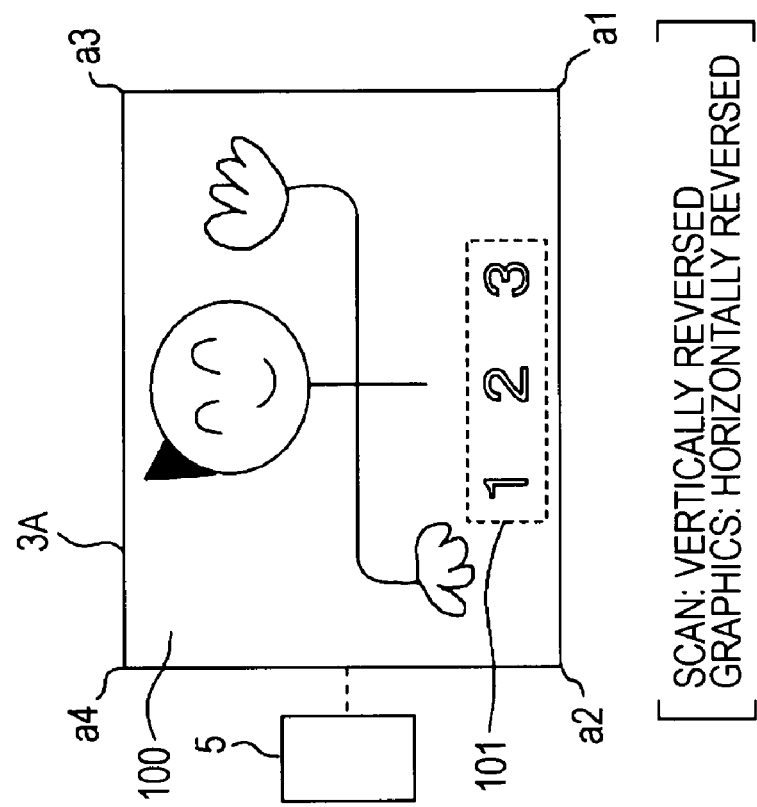
FIGS. 9A and 9B illustrate a display failure generated when the second example of the configuration for the monitor image display processing control is employed.
Figure 9B:
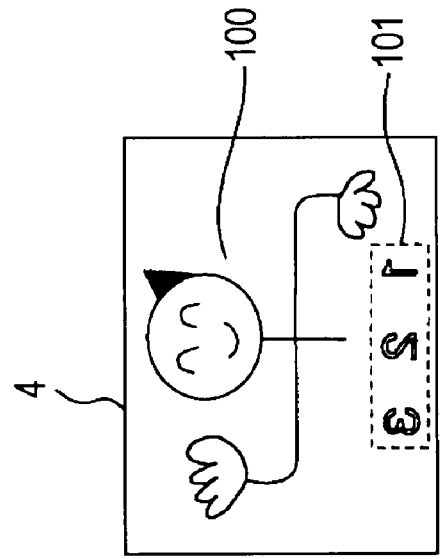

In this case, as shown in FIG. 9A, both the monitor image 100 and the graphics image 101 are appropriately displayed on the monitor screen unit 3A.

At this moment, the electronic viewfinder 4 can appropriately display the monitor image 100 through a normal scanning. However, the graphics signal synthesized with the video signal input to the electronic viewfinder 4 at this moment is already horizontally reversed by the horizontal reversing processing unit 12. Therefore, as shown in FIG. 4B, the horizontally reversed graphics image 101 is displayed.

Figure 10B:
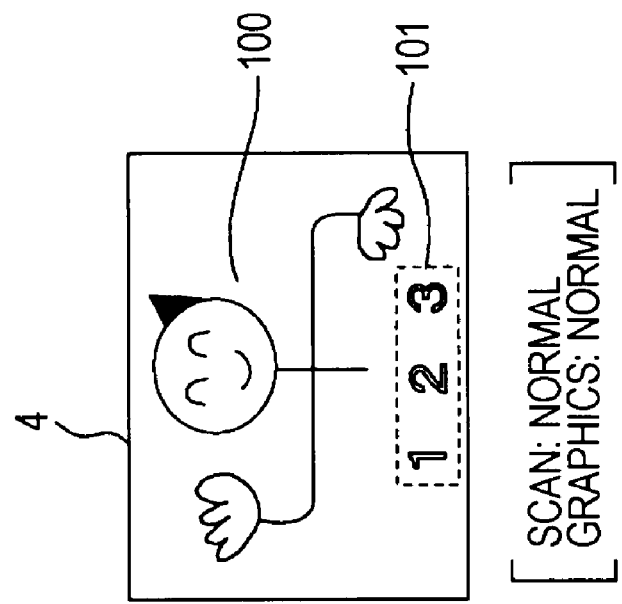
FIGS. 10A and 10B illustrate a display failure generated when the second example of the configuration for the monitor image display processing control is employed.
Figure 10A:
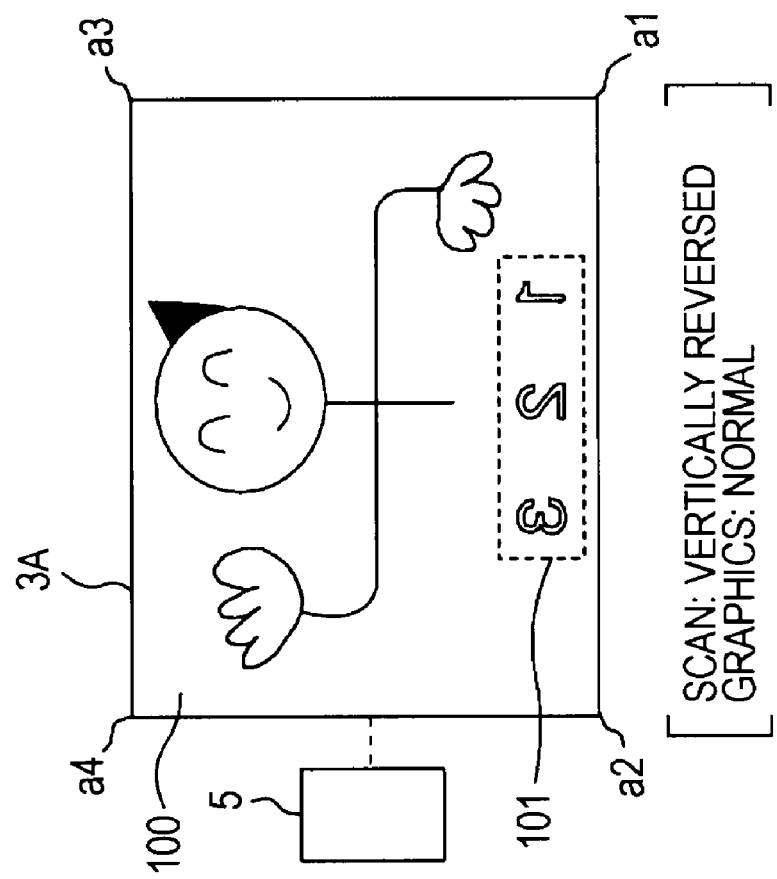

In this regard, for example, if the graphics signal is normally synthesized without horizontal reversing using the horizontal reversing processing unit 12, the electronic viewfinder 4 displays the graphics image 101 as well as the monitor image 100 in an appropriate horizontal position as shown in FIG. 10B. However, in turn, the graphics image 101 is reversely displayed in the monitor screen unit 3A as shown in FIG. 10A.

In this manner, in the signal processing configuration shown in FIG. 8, it is difficult appropriately to display the monitor image overlapped with the graphics image 101 in both the monitor screen unit 3A and the electronic viewfinder 4 at the same time because at least one of them is erroneously displayed.

5. Configuration for Monitor Image Display Processing Control (Third Example)

An example of appropriately displaying the monitor image 100 and the graphics image 101 in the monitor screen unit 3A and the electronic viewfinder 4 by integrating the video signal processing systems into a single system in the DSP 10 is illustrated in FIG. 11 as a third example. Also in this drawing, like reference numerals denote like elements as in FIGS. 7 and 8, and descriptions thereof will be omitted.

Also in the DSP 10 illustrated in FIG. 11, a single panel/finder signal processing unit 11 is provided as the video signal processing system, and the video signal subjected to the necessary processing in an internal signal processing unit 11a is output from the DSP 10. The signal processing unit 11a can perform a signal processing, for example, corresponding to the front-end signal processing unit 21 and the rear-end signal processing unit 23 in the aforementioned examples. The video signal output from the DSP 10 is separately input to the electronic viewfinder 4 and the monitor screen unit 3A.

In this case, two graphics signals (the graphics signal (E) and the graphics signal (P)) are output from the DSP 10. The graphics signal (E) is used for the electronic viewfinder 4 and input to the electronic viewfinder 4. The graphics signal (P) is used for the monitor screen unit 3A and input to the monitor screen unit 3A.

The graphics signal (E) and the graphics signal (P) are originally the same graphics signal.

The graphics signal (E) is a normal signal usually not subjected to the horizontal reversing processing regardless of whether the normal shot or the face-to-face shot is performed. On the contrary, while the graphics signal (P) is a normal signal without the horizontal flip in the case of the normal shot, the graphics signal (P) is a signal subjected to the horizontal reversing processing in the case of the face-to-face shot.

In this case, the DSP 10 generates a synthesis control signal xVIDEO(E) corresponding to the electronic viewfinder 4 and a synthesis control signal xVIDEO(P) corresponding to the monitor screen unit 3A.

A synthesis control signal xVIDEO(E)/(P) is a control signal for specifying a timing for synthesizing the graphics signal, for example, in the pixel unit. The synthesis control signal xVIDEO(E)/(P) is the same in the case of the normal shot. On the contrary, in the case of the face-to-face shot, the synthesis control signal xVIDEO(P) is switched to indicate a synthesis timing of the horizontally reversed graphics signal with respect to the synthesis control signal xVIDEO(E).

Furthermore, in the configuration shown in FIG. 11, the synthesizing unit is provided in the display devices of the electronic viewfinder 4 and monitor screen unit 3A.

The electronic viewfinder 4 internally includes a synthesizing unit 4a. The video signal, the graphics signal (E), and the synthesis control signal xVIDEO(E) are input from the panel/finder signal processing unit 11 to the synthesizing unit 4a.

Similarly, the monitor screen unit 3A internally includes a synthesizing unit 3a. The video signal, the graphics signal (P), and the synthesis control signal xVIDEO(P) are input from the panel/finder signal processing unit 11 to the synthesizing unit 3a.

The synthesizing unit 4a of the electronic viewfinder 4 executes a processing for appropriately synthesizing pixel data as the graphics signal (E) for the video signal in response to the instruction regarding whether or not the synthesis is performed for each pixel in the corresponding timing, represented by the synthesis control signal xVIDEO(E). The electronic viewfinder 4 performs the scanning for the video signal output from the synthesizing unit 4a after synthesizing the graphics signal.

In this case, the control unit 13 instructs the electronic viewfinder 4 to perform a normal scanning. Furthermore, in this case, the graphics signal (E) is usually output independently from the graphics signal (P) as a normal signal without horizontal reversing regardless of whether the normal shot or the face-to-face shot is performed. The control unit 13 instructs to synthesize the graphics signal depending on the synthesis control signal xVIDEO(E). As a result, the electronic viewfinder 4 appropriately displays the monitor image 100 overlapped with the graphics image 100 in both cases of the normal shot and the face-to-face shot.

The synthesizing unit 3a of the monitor screen unit 3A appropriately synthesizes pixel data as the graphics signal (P) for the video signal in response to the instruction regarding whether or not the synthesis is performed for each pixel in the corresponding timing, represented by the synthesis control signal xVIDEO(P). The monitor screen unit 3A performs the scanning for the video signal output from the synthesizing unit 3a after synthesizing the graphics signal.

In this case, first, a normal scanning is set by the control unit 13 in the case of the normal shot. On the contrary, in the case of the face-to-face shot, vertically-reversed scanning is set.

As a result, in the case of the normal shot, as shown in FIG. 4A, the monitor image 100 overlapped with the graphics image 101 is appropriately displayed.

In the case of the face-to-face shot, the monitor image 100 is appropriately displayed by vertically reversing. Furthermore, for the monitor screen unit 3A, the horizontally reversed graphics signal (P) is synthesized with the video signal by the synthesis control signal xVIDEO(P) which is horizontally reversed accordingly. Therefore, the graphics image 101 is displayed with an appropriate vertical position and horizontal direction.

In this manner, in the configuration shown in FIG. 11, while the video signal processing systems of the DSP 10 are integrated into a single system, the graphics image 101 and the monitor image 100 are appropriately displayed in the monitor screen unit 3A and the electronic viewfinder 4 at the same time.

However, for example, the graphics signal includes a considerable number of bits. As a typical example, it is assumed that the graphics signal is expressed by red, green, and blue colors (RGB), and each of the RGB colors is expressed by 8 bits. In this case, a single graphics signal includes 24 bits (=8×3).

Then, in FIG. 11, two graphics signals (E)/(P) each including 24 bits are output from the DSP 10. This means 48 physical pins (=24×2) are necessary to output the graphics signals (E)/(P) from the device as the DSP 10. Furthermore, considering each single bit for the synthesis control signals xVIDEO(E)/(P), a total of 50 pins are necessary.

In practice, the number of pins provided in the DSP 10 is limited, and 50 pins described above exceeds the limitation. Therefore, the configuration shown in FIG. 11 may be obtainable in concept but impractical in terms of the integration.

6. Configuration for Monitor Image Display Processing Control (Fourth Example): Embodiment 6-1. Fundamental Configuration According to Embodiment To summarise, it is demanded that there be provided the video signal processing system of the DSP 10, for example, which is simplified into a single system and has the number of pins that can be practically employed, so that the monitor image 100 and the graphics image 101 can be appropriately displayed at the same time.

Figure 12:
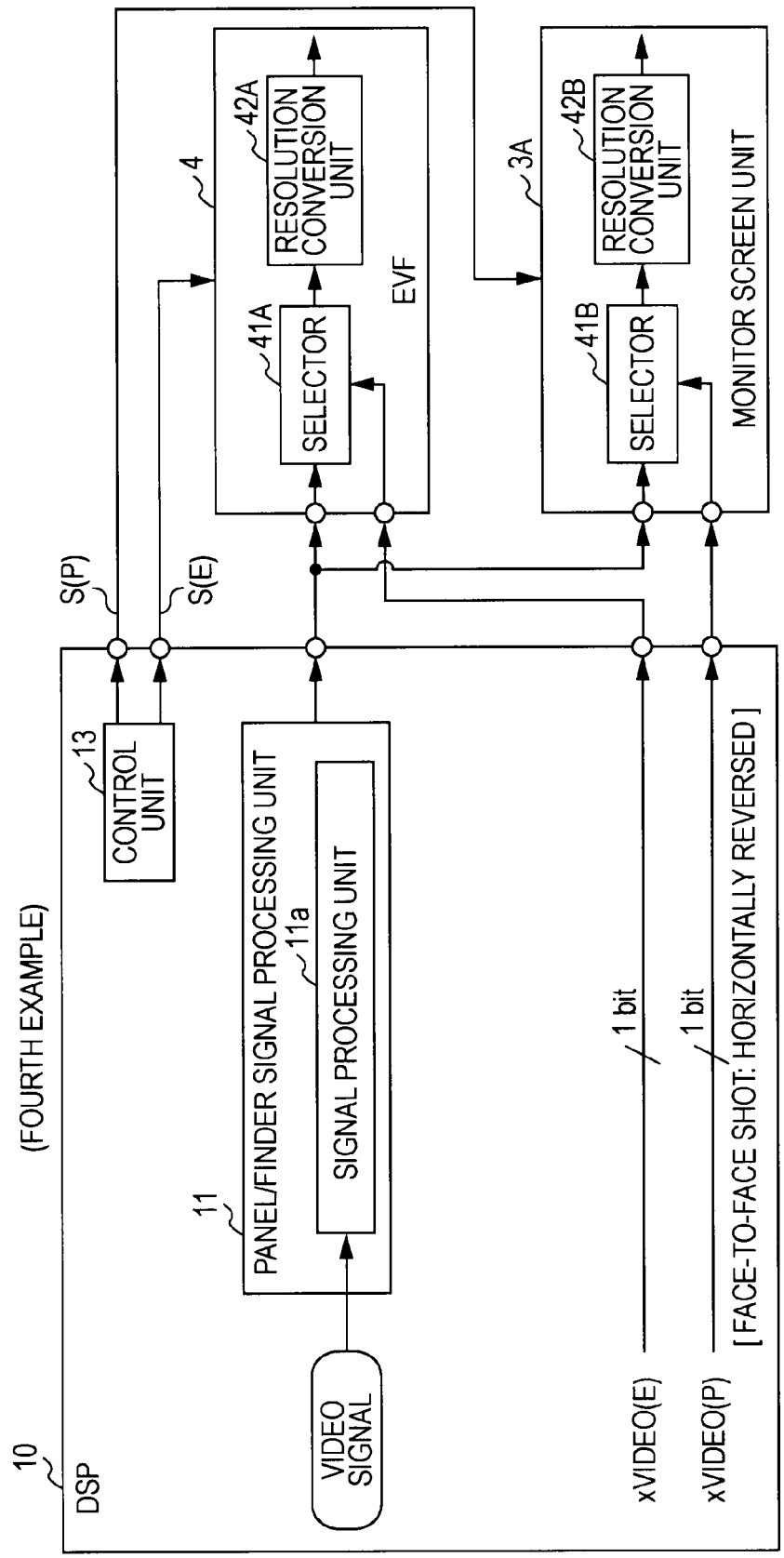
FIG. 12 is a block diagram illustrating a fourth example of the configuration for the monitor image display processing control as a fundamental configuration example according to an embodiment of the invention.

In this regard, an example of a configuration for processing and controlling the monitor image display that meets the aforementioned demand is illustrated in FIG. 12. This configuration corresponds to the fourth example considering the configurations of the monitor image display control process described herebefore and also represents a fundamental configuration example including the DSP 10 of the present embodiment, the electronic viewfinder 4, and the monitor screen unit 3A.

In addition, in FIG. 12, like reference numbers denote like elements as in FIG. 11, and descriptions thereof will be omitted.

Similar to FIG. 11, the DSP 10 shown in FIG. 12 includes a panel/finder signal processing unit 11 as a single video signal processing system.

In this case, the graphics signals (E)/(P) are not output from the DSP 10.

Similar to FIG. 11, the synthesis control signal xVIDEO (E) corresponding to the electronic viewfinder 4 and the synthesis control signal xVIDEO(P) corresponding to the monitor screen unit 3 are output from the DSP 10 to the electronic viewfinder 4 and the monitor screen unit 3A, respectively. In this fundamental configuration example, each synthesis control signal xVIDEO(E)/(P) includes a single bit.

In the configuration shown in FIG. 11, for example, 48 pins are necessary for two graphic signals (E) and (P), and a single bit is necessary for each synthesis control signal xVIDEO(E)/(P), so that a total of 50 bits are necessary. Accordingly, 50 pins are necessary for synthesizing the graphic signal.

On the contrary, in the configuration shown in FIG. 12, since the graphics signal (E) and the graphics signal (P) are not output from the DSP 10, it is possible to reduce the number of pins (48) accordingly. In order to synthesize the graphics signal, the number of pins corresponding to each single bit for the synthesis control signals xVIDEO(E)/(P) becomes 2. This number of pins (2) is close to the minimum number necessary to synthesize the graphic signal. For example, this number provides a sufficient margin to a practical DSP 10.

In addition, in the fourth example, an instruction of the scanning direction by the control unit 13 is executed as follows.

First, the electronic viewfinder 4 is instructed to execute the normal scanning in either case of the normal shot or the face-to-face shot.

The monitor screen unit 3A is instructed to execute the normal scanning in the case of the normal shot and execute the vertically reversed scanning in the case of the face-to-face shot.

The electronic viewfinder 4 shown in FIG. 12 includes a selector 41A and a resolution conversion unit 42A.

The selector 41A receives the video signal and the synthesis control signal xVIDEO(E) from the panel/finder signal processing unit 11, synthesizes the graphics signal with the video signal as described above, and outputs the results to the resolution conversion unit 42A. The resolution conversion unit 42A converts the resolution of the input video signal into a resolution suitable for the number of pixels of the display screen unit of the electronic viewfinder 4. The video signal output from the resolution conversion unit 42A is used to drive the display in the electronic viewfinder 4 to display an image.

In addition, the monitor screen unit 3A also includes a selector 41B and a resolution conversion unit 42B.

The selector 41B also receives the video signal and the synthesis control signal xVIDEO(P) from the panel/finder signal processing unit 11 and outputs the video signal synthesized with the graphics signal to the resolution conversion unit 42A. The resolution conversion unit 42B converts the resolution of the input video signal into a resolution suitable for the number of pixels of the monitor screen unit 3A. The video signal output from the resolution conversion unit 4B is used to drive the display in the monitor screen unit 3A to display an image.

In addition, if the resolution conversion process is not necessary in at least one of the display units, any one of the resolution conversion units 4A and 4B may not be provided in the display unit where the resolution conversion is not necessary. However, if both the resolution conversion units 4A and 4B are provided, preferably, it is possible to perform the process independently without influencing one of the display units by using the selector 41 to perform the resolution conversion process for the video signal after synthesizing the graphics image as shown in the drawing.

Figure 13:
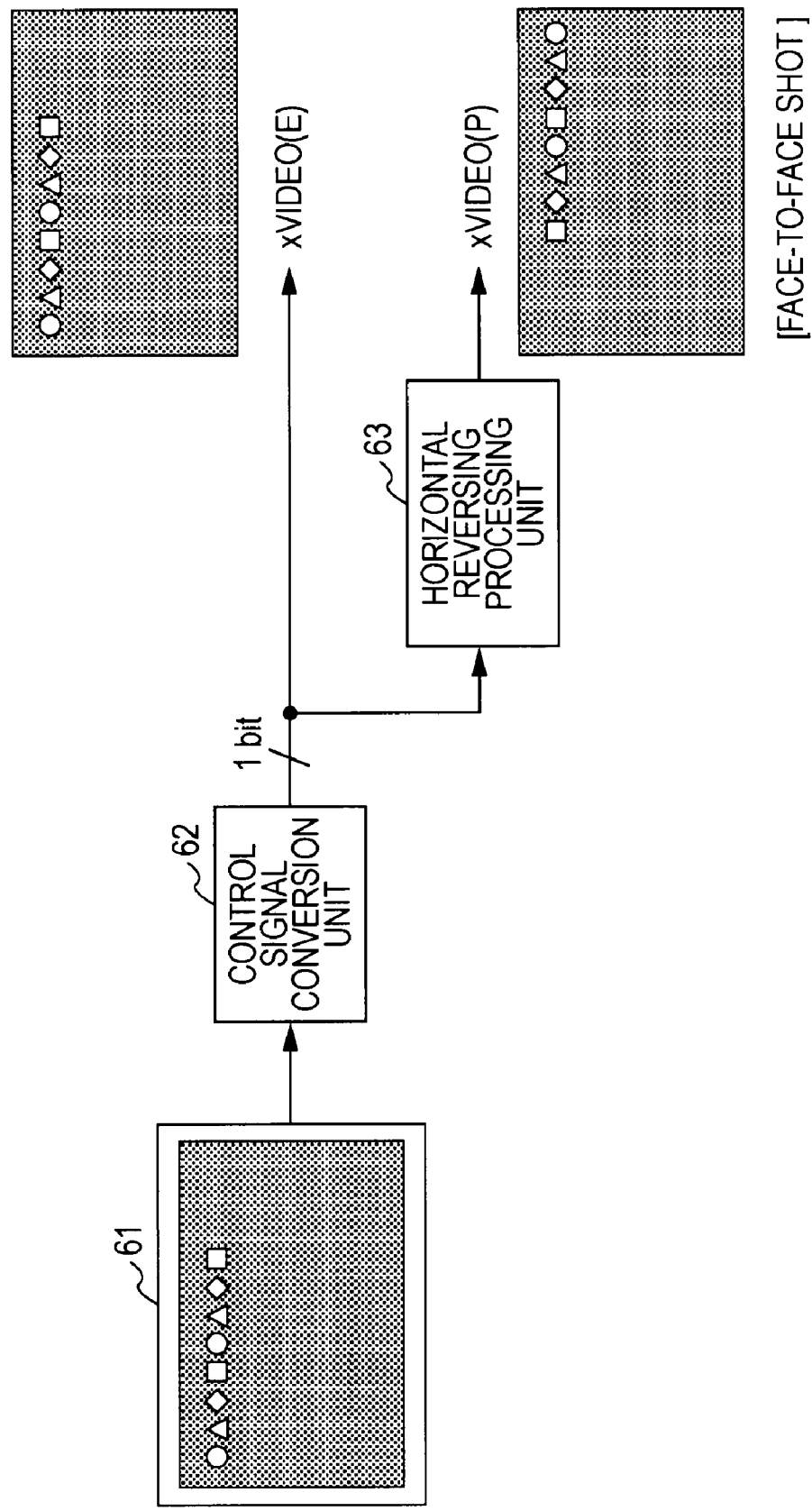
FIG. 13 illustrates an exemplary configuration for generating a synthesis control signal.

FIG. 13 illustrates a configuration example for a portion for generating the synthesis control signals xVIDEO(E)/(P) in the DSP 10.

The graphics memory 61 stores the graphics image data corresponding to the graphics image 101, for example, in the unit of frame. The graphics image data are written to the graphics memory 61, for example, using a functional unit capable of executing a process of the OSD (not shown).

In this case, the control signal conversion unit 62 reads the data stored in the graphics memory 61 and generates a signal of a single bit stream where a single bit corresponds to a single pixel in the order of, for example, a scanning sequence. This signal is represented as 1 (High) for the pixel which generates the graphics signal and as 0 (Low) for the pixel which does not generate the graphics signal.

The signal of a single bit stream output from the control signal conversion unit 62 is divided into two kinds of signals. One of them is the synthesis control signal xVIDEO(E) corresponding to the electronic viewfinder 4. The other one of them is the synthesis control signal xVIDEO(P) corresponding to the monitor screen unit 3A through the horizontal reversing processing unit 63.

Similar to the horizontal reversing processing unit 12 described above, the horizontal reversing processing unit 63 executes a horizontal reversing process in the case of only the face-to-face shot. In this case, for example, specifically, the horizontal reversing processing may be executed using a LIFO (Last In First Out) or FILO (First In Last Out) which reverses the arrangement order for each bit stream corresponding to the pixels included in a single horizontal line.

Figure 14:
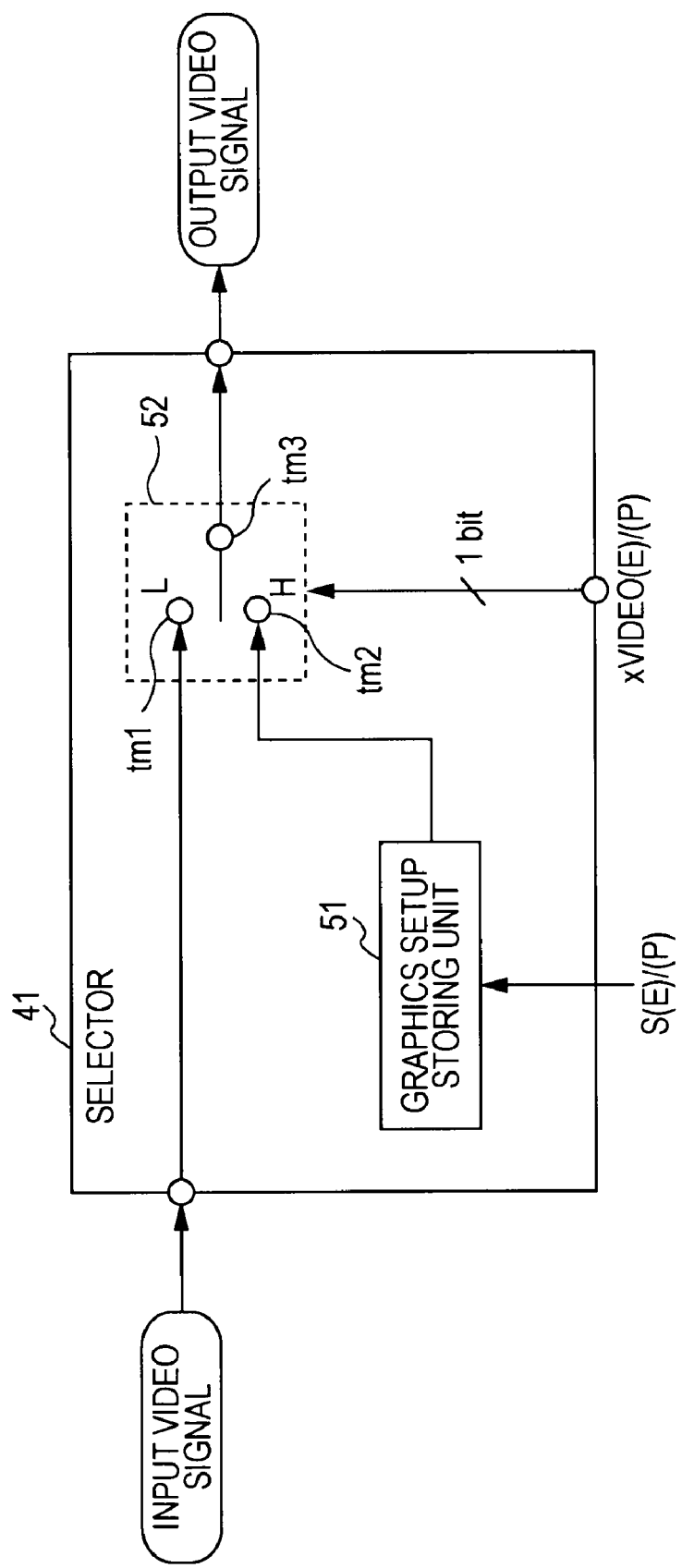
FIG. 14 illustrates an exemplary configuration of a selector.

FIG. 14 illustrates a configuration example of the selector 41. The selector 41 shown in FIG. 14 is common to the selector 41B of the monitor screen unit 3A and the selector 41A of the electronic viewfinder 4 shown in FIG. 12.

The selector 41 of FIG. 14 includes a graphics setup storing unit 51 and a switch 52.

For example, in the case of the selector 41A of the electronic viewfinder 4, the color data (the color signal) used as the graphics image 101 are set based on the control signal S(E) from control unit 13 and stored in the graphics setup storing unit 51. The graphics setup storing unit 51 outputs the color data stored in this way as color pixel data that can express colors for each pixel to form the video signal.

More specifically, these color data are formed by combining, for example, a color level and a luminance level. Similarly, in the case of the selector 41B of the monitor screen unit 3A, the graphics setup storing unit 51 sets the color data used as the graphics image 101 based on the control signal S(P). However, in order to set the color data on the graphics image in this way, the control signals S(P) and S(E) are output accordingly.

For example, the following configuration may come into consideration as how to set the color data in response to the control signal S(E)/(P) in the graphics setup storing unit 51.

The graphics setup storing unit 51 has a table containing numbers representing the control signals S(E)/(P) and color data corresponding to these numbers. The graphics setup storing unit 51 reads the color data corresponding to the numbers representing the control signals S(E)/(P) from the table and outputs them by setting them to themselves.

The switch 52 switches terminals based on the synthesis control signal xVIDEO(E) (in the case of the selector 41A within the electronic viewfinder 4) or the synthesis control signal xVIDEO(P) (in the case of the selector 41B within the monitor screen unit 3A).

The switch 52 is configured to switch such that the terminal tm3 is connected to one of the terminals tm1 and tm2. The video signal from the DSP 10 (i.e., the panel/finder signal processing unit 11) is input to the terminal tm1 as an input image signal. The color pixel data output from the graphics setup storing unit 51 are input to the terminal tm2.

As described above, the synthesis control signal xVIDEO(E)/(P) is a signal of a single bit stream set to have a high level H for the pixels where the graphics image is to be displayed and a low level L for other pixels.

The switch 52 switches such that the terminals tm2 and tm3 are connected to each other when the synthesis control signal xVIDEO(E)/(P) has a high level H, and the terminals tm1 and tm3 are connected to each other when the synthesis control signal xVIDEO(E)/(P) has a low level L.

As a result, the video signal (i.e., the display video signal) output from the terminal tm3 is substituted with the color pixel data output from the graphics setup storing unit 51 for the pixels where the graphics image is to be displayed. That is, it is possible to obtain the video signal in which the monitor image is synthesized with the graphics image.

In the fundamental configuration according to an embodiment of the invention, the color data for the graphics setup storing unit 51 are set by using a single field as a shortest period based on the control signal S(P)/(E). For example, the color data are set based on conditions such as a processing capacity of the control unit 13 in the DSP 10 or a communication speed between the control unit 13 side of the DSP 10 and the electronic viewfinder 4 and monitor screen unit 3A side.

Figure 15:
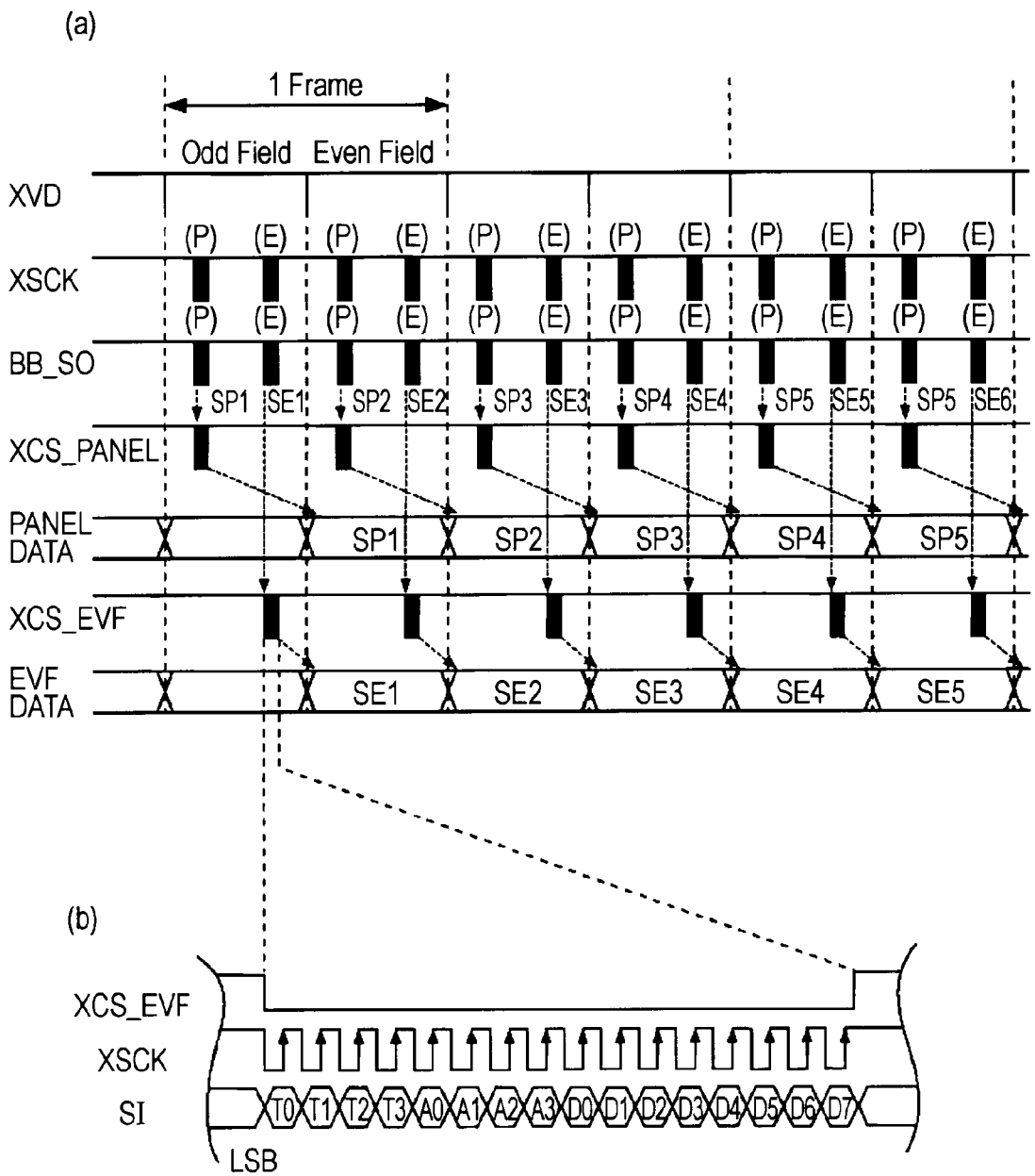
FIGS. 15A and 15B are timing charts illustrating a transmission timing of a control signal for setting color data.

An example of timings for outputting the control signal S(P)/(E) based on the color data setup for a single frame period is illustrated in the timing chart of FIGS. 15A and 15B.

In FIG. 15A, the reference symbol XVD denotes, for example, a timing pulse corresponding to the field period that can be obtained inside the DSP 10. The frame period is set to two periods of the timing pulse XVD.

The reference symbol XSCK denotes a transmission clock for synchronization with the transmission timing of the control signal S(P)/(E) for the color data setup from the control unit 13. The transmission clock XSCK is oscillated with a predetermined period as shown in the center of FIG. 15B only during the period when the control signal S(P)/(E) of the color data setup is to be output so as to obtain 16 rising edges.

The reference symbol BB-SO corresponds to the control signal S(P)/(E) of the color data setup, output from the control unit 13 of the DSP 10.

As shown in the drawing, the data corresponding to BB-SO are output twice per single field, where the first data output first becomes the data to be input to the monitor screen unit 3A, and the second data output subsequently becomes the data to be input to the electronic viewfinder 4. As will be described later, each of the first and second data has a sequence of 16 bits.

Then, assuming that the reference symbol SPn (where, n denotes any natural number) denotes the data BB-SO corresponding to the monitor screen unit 3A, and the reference symbol SEn denotes the data BB-SO corresponding to the electronic viewfinder 4, the data SP1, SP2, SP3, SP4, SP5, SP6, ... corresponding to the monitor screen unit 3A are sequentially output by the first data of each field, and the data SE1, SE2, SE3, SE4, SE5, SE6, ... are sequentially output by the second data as shown in FIG. 15A.

The reference symbol XCS_PANEL denotes a signal input from the DSP 10 to the monitor screen unit 3A to instruct to receive the data BB-SO (i.e., the data SPn). The signal XCS_PANEL is triggered to the L level for the corresponding duration when the data SPn are output at a single time per single field as shown in the drawing.

The reference symbol XCS_EVF denotes a signal input from the DSP 10 to the electronic viewfinder 4 to instruct to receive the data BB-SO (i.e., the data SEn). The signal XCS_EVF is triggered to the L level for the corresponding duration when the data SEn are output in a single time per a single field as shown in the drawing.

Here, FIG. 15B illustrates a data input operation in the electronic viewfinder 4 side for the corresponding duration when the data SE1 is output.

The data SE1 is represented as input data SI of the electronic viewfinder 4. In this manner, a unit of the input data SI (i.e., the data SEn) includes a bit stream of 16 bits.

For example, the data of 16 bits as the input data SI includes T0, T1, T2, T3, A0, A1, A2, A3, D0, D1, D2, D3, D4, D5, D6, and D7 from the least significant bit (LSB) to the most significant bit (MSB). The four bits T0, T1, T2, and T3 represent, for example, a preamble. The four bits A0, A1, A2, and A3 represents an address. The remaining eight bits D0 to D7 represent data. The address of the color data setup is represented by the bits A0, A1, A2, and A3 based on the color data setup. In addition, the color data such as the color level or the luminance level are designated by the bits D0 to D7.

As described above, the signal XCS_EVF is triggered to the low level L in response to the output timing of the data SEn, and the electronic viewfinder 4 receives the input data SI only when the signal XCS_EVF has a low level L. As the timing for receiving the input data SI when the signal XCS_EVF has a low level L, as shown in FIG. 15B, a single bit is received at each rising-edge timing of the transmission clock XSCK.

The data SE1 received by the electronic viewfinder 4 in this manner is activated in the field duration subsequent to the field in which the data SE1 is output as shown as the EVF data in FIG. 15A. This means that graphics setup storing unit 51 sets and outputs the color pixel data for the subsequent field duration based on the control signal of the color data setup obtained within the immediately previous field duration.

As shown in FIG. 15B, the monitor screen unit 3A receives the data SPn of 16 bits at the rising-edge timings of the transmission clock XSCK when the signal XCS_PANEL has a low level L and performs setup by reflecting the input data at the subsequent field duration.

In this manner, both the color data setup in the selector 41A of the electronic viewfinder 4 and the color data setup in the selector 41B of the monitor screen unit 3A are performed for each field duration.

For example, all the data SEn/SPn output from the DSP 10 for the same field duration are reflected in the color data setup in the same subsequent field duration.

For example, if the same graphics image 101 is to be displayed in the electronic viewfinder 4 and the monitor screen unit 3A, the same data SEn/SPn for color data setup are output for the same field duration. In this case, the data SEn/SPn are reflected in both the electronic viewfinder 4 and the monitor screen unit 3A for the same subsequent field duration as described above. Therefore, the timing is hardly deviated for the graphics image display between the electronic viewfinder 4 and the monitor screen unit 3A.

6-2. Modification 1

Meanwhile, in the fundamental configuration according to an embodiment of the invention as described in conjunction with FIGS. 12 to 15, the single-color pixel data (color signal) can be specified and stored in the graphics setup storing unit 51 based on the control signal S(E)/(P) (corresponding to the data SEn/SPn).

In comparison, a configuration capable of setting two-color pixel data will be described as a modification 1 of the invention.

First, the fundamental configuration of the DSP 10 is similar to that shown in FIG. 12. However, the synthesis control signal xVIDEO(E)/xVIDEO(P) is set to 2 bits because the color pixel data represents two colors.

As a result, in comparison with the fundamental configuration described in conjunction with FIG. 12, the number of pins of the DSP 10 necessary for the color data setup increases from 2 to 4. However, such a small increased number may be neglected when the DSP 10 is integrated in practice.

Figure 16:
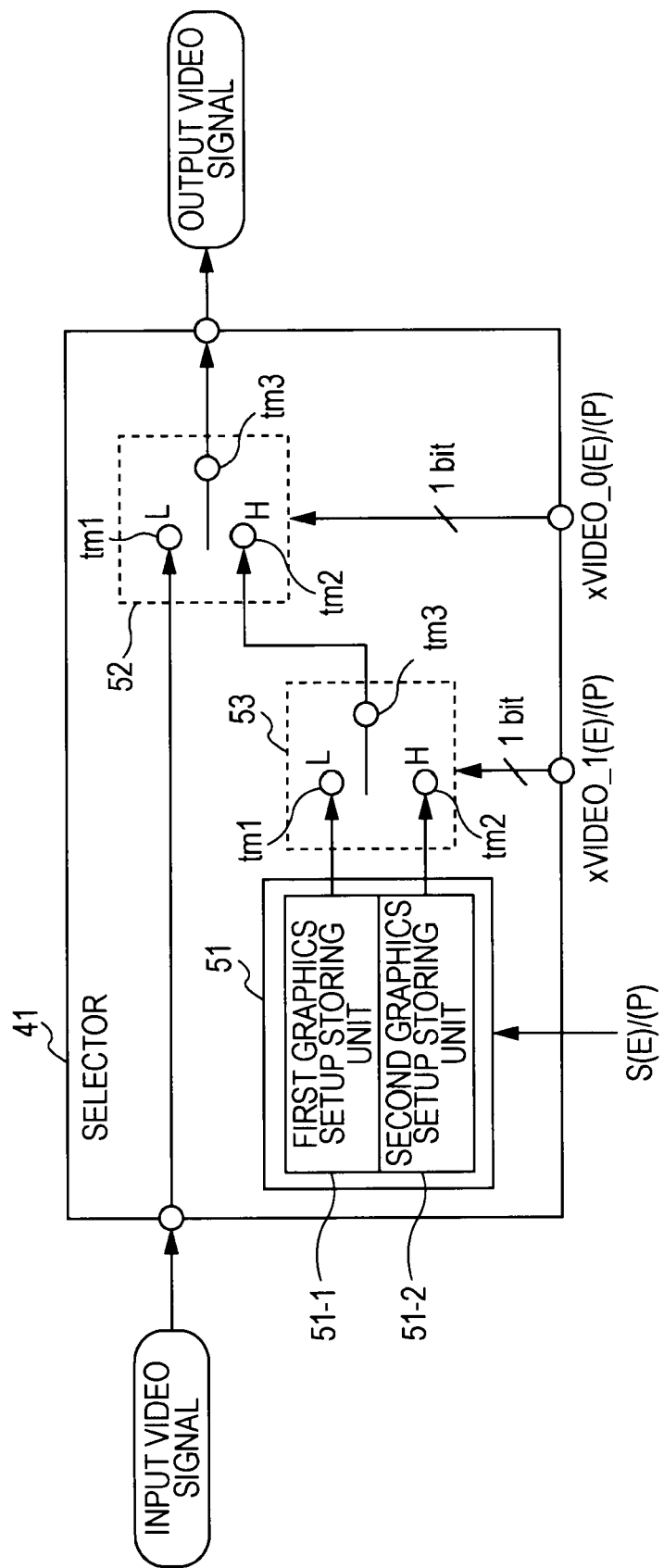
FIG. 16 illustrates a first example of the configuration according an embodiment of the invention.

FIG. 16 illustrates a configuration example of the selector 41 (41A and 41B) according to the modification 1. In FIG. 16, like reference numerals denote like elements as in FIG. 14, and descriptions thereof will be omitted.

The graphics setup storing unit 51 shown in FIG. 16 includes a first graphics setup storing unit 51-1 and a second graphics setup storing unit 51-2.

The first graphics setup storing unit 51-1 and the second graphics setup storing unit 51-2 are configured to set and store the color pixel data for each single field duration in response to the control signal S(E)/(P) for the color data setup. In this case, the control signal S(E)/(P) is used to select one of the first graphics setup storing unit 51-1 and the second graphics setup storing unit 51-2 and selects the color data such as the color level and the luminance data. As a result, each of the first graphics setup storing unit 51-1 and the second graphics setup storing unit 51-2 can set and store different color pixel data. That is, two colors can be set for the graphics image 101.

A switch 53 is provided in the selector 41. The color pixel data output from the first graphics setup storing unit 51-1 are input to the terminal tm1 of the switch 53, and the color pixel data output from the second graphics setup storing unit 51-2 are input to the terminal tm2 of the switch 53.

Similar to the switch 52, the switch 53 is configured to switch such that the terminal tm3 can be connected to any one of the terminals tm1 or tm2. The terminal tm3 of the switch 52 is connected to the terminal tm2 of the switch 52.

In this modification 1, two bits are used in the synthesis control signal xVIDEO(E)/(P). Out of the two bits of the synthesis control signal xVIDEO(E)/(P), one bit is used for the xVIDEO_0(E)/(P), and the other bit is used for the xVIDEO_1(E)/(P).

First, similar to the case of FIG. 14, the synthesis control signal xVIDEO_0(E)/(P) is used to operate the switch 52 and has a high level H for the pixels for forming the graphics image and a low level L for the remaining pixels.

As will be described later, the signal output from the switch 53 corresponds to the color pixel data set and stored in any one of the first graphics setup storing unit 51-1 and the second graphics setup storing unit 51-2. That is, it corresponds to the data on the graphics image 101. Therefore, similar to the fundamental configuration, the video signal output from the switch 52 becomes the video signal in which the graphics image is synthesized with the monitor image.

In this case, the synthesis control signal xVIDEO_1(E)/(P) becomes 0 (a low level L) for the color set in the first graphics setup storing unit 51-1 and becomes 1 (a high level H) for the color set in the second graphics setup storing unit 51-2 out of the color pixel data of two colors forming the graphics image 101. That is, the synthesis control signal xVIDEO_1(E)/(P) is used to select the color of the graphics image 101 out of two colors.

The synthesis control signal xVIDEO_0(E)/(P) becomes a high level H according to the pixels of the graphics image 101 and can be generated similar to the signal xVIDEO(E)/(P) described above in conjunction with FIG. 13.

The synthesis control signal xVIDEO_1(E)/(P) may be set to 0 (a low level L) in the case of the color set to the first graphics setup storing unit 51-1 and set to 1 (a high level H) in the case of the color set to the second graphics setup storing unit 51-2 for the pixels of the graphics image read from the graphics memory 61 after the control signal conversion unit 62 is allowed to determine the color.

In this configuration, when the terminal tm3 of the switch 52 is connected to the terminal tm2 to select the color pixel data on the graphics image 101, the switch 53 selects the color pixel data from any one of the first graphics setup storing unit 51-1 and the second graphics setup storing unit 51-2 depending on the color of the graphics image 101 and outputs it from the terminal tm3. As a result, the video signal output from the selector 41 becomes the video signal in which the two color graphics image 101 is synthesized with the monitor image.

6-3. Modification 2

Figure 17:
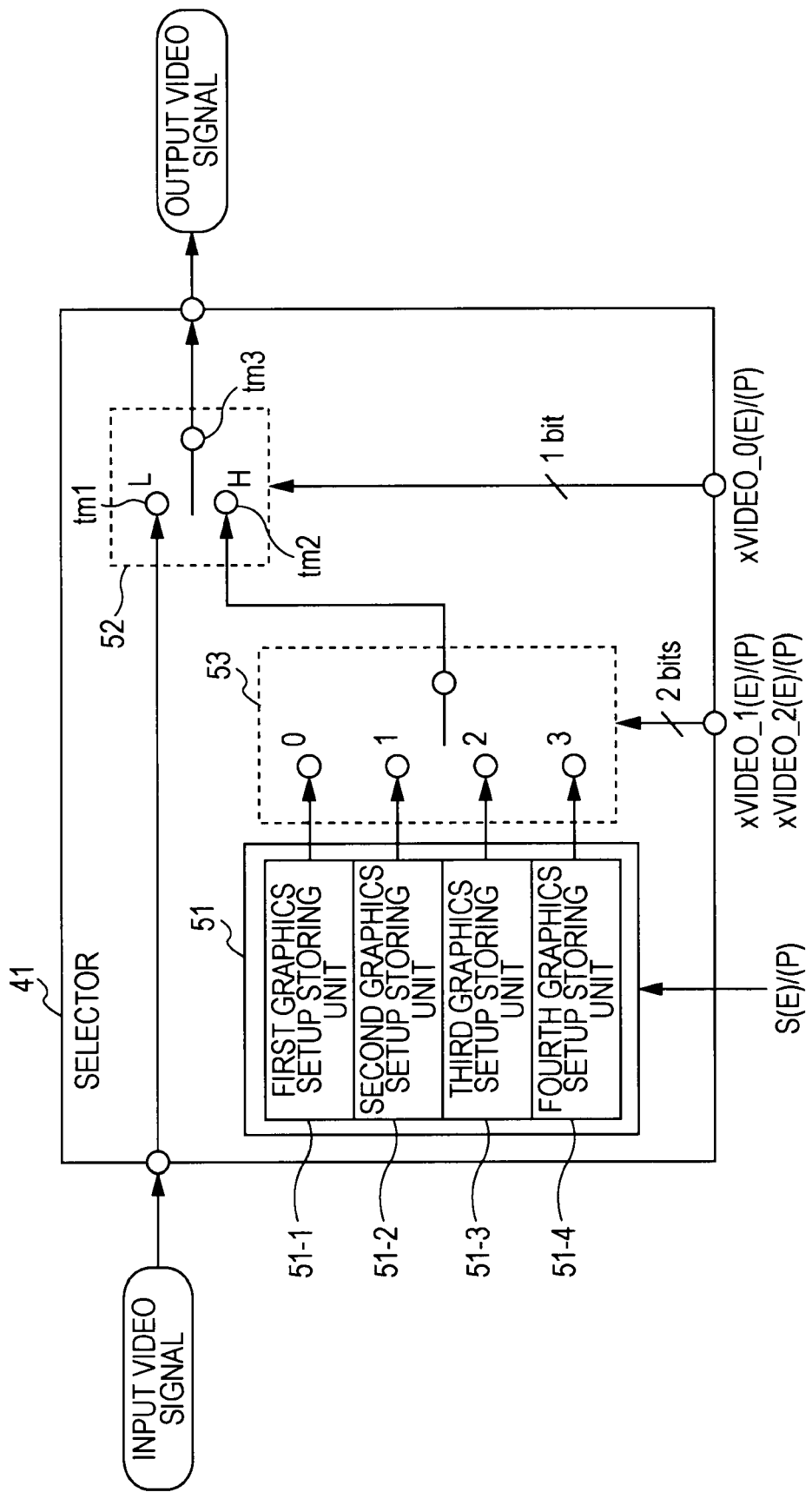
FIG. 17 illustrates a second example of the configuration according an embodiment of the invention.

According to the aforementioned embodiments, it is anticipated that the number of colors capable of display control as the graphics image 101 may increase according to the bit number of the synthesis control signal xVIDEO(E)/(P). In this regard, a configuration example of the selector 41 (41A, 41B) corresponding to a case where three bits are used for the synthesis control signal xVIDEO(E)/(P) is illustrated in FIG. 17. In FIG. 17, like reference numerals denote like elements as in FIG. 16, and descriptions thereof will be omitted.

Here, the 3-bit synthesis control signal xVIDEO(E)/(P) is divided into three signals xVIDEO_0(E)/(P), xVIDEO_1(E)/(P), and xVIDEO_2(E)/(P) for each bit.

Similar to FIG. 16A, a single bit of the synthesis control signal xVIDEO_0(E)/(P) is used to operate the switch 52.

In addition, the remaining two bits of the synthesis control signals xVIDEO_1(E)/(P) and xVIDEO_2(E)/(P) are allocated to the switching control of the switch 53. Here, a fact that two bits are allocated means that four switching operations can be made, and four colors can be selected at maximum. That is, in this case, it is possible to display the graphics image 101 using four colors at maximum.

Accordingly, the graphics setup storing unit 51 of FIG. 17 includes first to fourth graphics setup storing units 51-1 to 51-4.

The first to fourth graphics setup storing units 51-1 to 51-4 can be used to set color data of four different colors based on the control signal S(E)/(P).

Also in this configuration, first, as a result of the switching operation of the switch 52 based on the synthesis control signal xVIDEO_0(E)/(P), it is possible to obtain the video signal in which the graphics image is synthesized with the monitor image. Furthermore, when the color pixel data on the graphics image is selected by the switch 52, the switching control of the switch 52 is performed using the two-bit synthesis control signal xVIDEO_1(E)/(P) and xVIDEO_2(E)/(P), and the color pixel data from any one of the first to fourth graphics setup storing units 51-1 to 51-4 is input to the switch 52.

In this manner, according to the modification 2, it is possible to display graphics image 101 using four colors.

As understood from the modifications 1 and 2, according to an embodiment of the invention, while a single bit is allocated to the synthesis control signal xVIDEO_0(E)/(P) (corresponding to the position specifying control signal) for specifying the synthesis position of the color data, the number of bits for the synthesis control signals xVIDEO_1(E)/(P) to xVIDEO_m(E)/(P) (corresponding to the color selection control signal) (where, m is any natural number) can increase. As a result, since the number of colors for forming the graphics image can increase, it is possible to express the graphics image 101 using diversified colors. In other words, depending on the number of colors necessary to form the graphics image, the number of the synthesis control signals xVIDEO_1(E)/(P) to xVIDEO_m(E)/(P) (i.e., the number of bits) for selecting the color may increase.

For example, assuming that the number of colors necessary to form the graphics image (corresponding to the graphics setup storing unit 51-1 to 51-n) is set to n, and the number of bits for the synthesis control signals xVIDEO_1(E)/(P) to xVIDEO_m(E)/(P) is set to m, the number of bits for the synthesis control signal for selecting the color is set under the condition that $n \leq 2^m$.

As recognized from the aforementioned description, it may be necessary to increase the number of pins in the DSP 10 as the number of bits for the synthesis control signal xVIDEO(E)/(P) increases. However, practically, the number of colors necessary for the graphics image 101 is not large. Therefore, even when the number of colors for the graphics image 101 increases within a practical range, the number of pins to be provided in the DSP 10 can be sufficiently set to an allowable range for the integration.

In the aforementioned descriptions, the shortest period capable of switching the color data setup of the graphics setup storing unit 51 (51-1 to 51-n) based on the control signal S(E)/(P) (data SE/P) from the control unit 13 of the DSP 10 is a single field as shown in FIG. 15A. For example, this is an optimal example set by considering the processing capacity of the control unit 13 of the DSP 10 that can be integrated to a consumer electronic device and a communication speed between the DSP 10 and the electronic viewfinder 4 and monitor screen unit 3A side.

However, for example, when the DSP having a higher processing capacity than that described above can be integrated, or when the communication speed between devices can increase to a high speed, the graphics setup storing unit 51 can be configured to change and set the color data at the timing corresponding to the pixel unit of the video signal data based on the control signal S(E)/(P) (corresponding to the data SE/P).

If the color data can be changed at the timing of the pixel data, while the graphics image 101 can be formed by a plurality of colors, the graphics setup storing unit 51 is not necessary to be plural according to the number of colors and may be single as described in the modifications 1 and 2.

In the aforementioned descriptions, it is assumed that the monitor screen unit 3A has a structure in which the movable mechanism 5 is rotated by reversing the vertical direction of the movable monitor panel unit 3 in order to change the orientation of the monitor screen unit 3A from the normal shot to the face-to-face shot. That is, the movement direction for the reversing corresponds to the vertical direction.

However, for example, even when the movable mechanism 5 is configured such that the movement direction for reversing the monitor screen unit 3A corresponds to the horizontal direction, the monitor screen display processing control shown in FIG. 8 generates the same failure.

That is, for example, in this case, in order appropriately to display the monitor image 100 and the graphics image 101 on the monitor screen unit 3A in the case of the face-to-face shot, horizontal reversing is performed for the scanning of the monitor screen unit 3A, and the graphics image 101 is horizontally reversed by the horizontal reversing processing unit 12 as well. However, in this case, while the monitor image 100 can be appropriately displayed on the electronic viewfinder 4 by a normal scanning, the graphics image 101 is erroneously displayed in a horizontally-reversed state.

Therefore, the configurations shown after FIG. 12 according to an embodiment of the invention may be applicable to a case where the movable mechanism 5 is rotated to reverse the vertical direction of the movable monitor panel unit 3 in order to change the orientation of the monitor screen unit 3A from the normal shot to the face-to-face shot.

In the aforementioned descriptions, it is assumed that the same graphics image 101 is displayed on the electronic viewfinder 4 and the monitor screen unit 3A. In addition, the aforementioned descriptions relate to a configuration for addressing the problem in the monitor image display generated thereby.

However, in the configurations according to an embodiment of the invention shown in FIGS. 12 to 17, the graphics signal is synthesized with the monitor image in each of the electronic viewfinder 4 and the monitor screen unit 3A. Therefore, different graphics images 101 can be generated in the electronic viewfinder 4 and the monitor screen unit 3A. For this reason, first, the synthesis control signals xVIDEO (E)/(P) output from the DSP 10 are independently set for each of the different graphics images. In addition, as the control signals S(E)/(P) for the color data setup output from the control unit 13, the data signal (SEn/SPn) for specifying the color data corresponding to the different graphics images may be output.

In FIG. 12, it is assumed that selector 41 (41A, 41B) and the resolution conversion unit 42(42A, 42B) for synthesizing the color data (the color signal) with the video signal are provided in the electronic viewfinder 4 and monitor screen unit 3A, respectively. However, this configuration is an example of hardware integration. The selector 41, the resolution conversion unit 41, or the like may be provided outside the devices of the electronic viewfinder 4 and the monitor screen unit 3A.

As described above, each process executed by the DSP 10 is implemented by a program (instructions) included in the DSP 10. This program is stored in a storage device of the DSP 10 and may be stored in, for example, an external recording medium.

In the aforementioned descriptions, while the configuration of the present invention is applied to the video camera device, it may be applied to other devices such as a plurality of image display units, and the capture image and the graphics image are displayed.

The present application contains subject matter related to that disclosed in Japanese Priority Patent Application JP 2009-122087 filed in the Japan Patent Office on May 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
a first image display unit that is provided not to reverse a display direction and displays an image by receiving a first display video signal and executing a scanning;
a second image display unit that is provided to change a display direction to a first display direction and a second display direction which is a reversed direction to the first display direction and displays an image by receiving a second display video signal and performing a scanning;
a video signal processing means that executes a predetermined signal processing for the video signal obtained based on a captured image;
a scanning direction instructing means that instructs the second image display unit to execute a normal scanning in a first state corresponding to the first display direction and execute a reversed scanning by reversing a corresponding scanning direction to a movement direction of the second image display unit to reverse an image from the first display direction to the second display direction in a second state corresponding to the second display direction;
a first color specifying means that specifies a color of a graphics image corresponding to the first image display unit;
a second color specifying means that specifies a color of a graphics image corresponding to the second image display unit;
a first position specifying means that specifies a position of the graphics image to be synthesized with an image of the video signal corresponding to the first image display unit;
a second position specifying means that specifies a position of the graphics image to be synthesized with an image of the video signal corresponding to the second image display unit in such a way that a normal position is specified without horizontal reversing in the first state and a reversed position is specified by horizontally reversing in the second state;
a first synthesizing means that outputs, as the first display video signal, a signal obtained by synthesizing a signal of a color stored when the first color specifying means specifies a color with the video signal input from the video signal processing means at a position specified by the first position specifying means; and
a second synthesizing means that outputs, as the second display video signal, a signal obtained by synthesizing a signal of a color stored when the second color specifying means specifies a color with the video signal input from the video signal processing means at a position specified by the second position specifying means.

2. The image display device according to claim 1, wherein the first and second position specifying means output a position specifying control signal representing a position of a pixel where the graphics image is to be synthesized with the video signal and a position of a pixel where the graphics image is not to be synthesized with the video signal using a single bit.

3. The image display device according to claim 1 or 2, wherein the first and second color specifying means specify a plurality of predetermined colors,
wherein the image display device further includes
a first color selection specifying means that specifies a single color to be selected from a plurality of colors specified by the first color specifying means for each position of the graphics image synthesized with the image of the video signal specified by the first position specifying means corresponding to the first image display unit, and
a second color selection specifying means that specifies a single color to be selected from a plurality of colors specified by the second color specifying means for each position of the graphics image synthesized with the image of the video signal specified by the second position specifying means corresponding to the second image display unit, wherein the first synthesizing means stores a plurality of color signals corresponding to a plurality of colors specified by the first color specifying means, selects a color signal specified by the first color selection specifying means from the color signals, synthesizes the selected color signal with the video signal input from the video signal processing means at the position specified by the first position specifying means, and outputs the synthesized signal as the first display video signal, and wherein the second synthesizing means stores a plurality of color signals corresponding to a plurality of colors specified by the second color specifying means, selects a color signal specified by the second color selection specifying means from the color signals, synthesizes the selected color signal with the video signal input from the video signal processing means at the position specified by the second position specifying means, and outputs the synthesized signal as the second display video signal.

4. The image display device according to claim 3, wherein the first and second color selection specifying means are configured such that the color to be selected is specified based on a combination of bit values by a color selection control signal of m bits satisfying a condition of $n \leq 2^m$, where, "^" denotes a power function, and n denotes the number of colors specified by the first and second color specifying means, respectively.

5. The image display device according to claim 1 or 2, wherein the first and second color specifying means transmit a control signal for specifying a color using a single field as a shortest period to the first and second synthesizing means, respectively, and wherein the first and second synthesizing means store a color signal based on a control signal for specifying the input color at a field duration subsequent to a field duration in which the control signal for specifying the color is input.

6. An image display method comprising:

a video signal processing process that executes a predetermined signal processing for a video signal obtained based on an image capturing, the video signal being displayed on a first image display unit that is provided not to reverse a display direction and displays an image by receiving a first display video signal and executing a scanning and a second image display unit that is provided to change a display direction to a first display direction and a second display direction which is a reversed direction to the first display direction and displays an image by receiving a second display video signal and performing a scanning;

a scanning direction instructing process that instructs the second image display unit to execute a normal scanning in a first state corresponding to the first display direction and execute a reversed scanning by reversing a corresponding scanning direction to a movement direction of the second image display unit to reverse an image from the first display direction to the second display direction in a second state corresponding to the second display direction;

a first color specifying process that specifies a color of a graphics image corresponding to the first image display unit;

a second color specifying process that specifies a color of a graphics image corresponding to the second image display unit;

a first position specifying process that specifies a position of the graphics image to be synthesized with an image of the video signal corresponding to the first image display unit;

a second position specifying process that specifies a position of the graphics image to be synthesized with an image of the video signal corresponding to the second image display unit in such a way that a normal position is specified without horizontal reversing in the first state and a reversed position is specified by horizontally reversing in the second state;

a first synthesizing process that outputs, as the first display video signal, a signal obtained by synthesizing a signal of a color stored when the color is specified through the first color specifying process with the video signal input from the video signal processing process at a position specified by the first position specifying process; and a second synthesizing process that outputs, as the second display video signal, a signal obtained by synthesizing a signal of a color stored when the color is specified through the second color specifying process with the video signal input from the video signal processing process at a position specified by the second position specifying process.

7. An image display device comprising:

a first image display unit that is provided not to reverse a display direction and displays an image by receiving a first display video signal and executing a scanning;

a second image display unit that is provided to change a display direction to a first display direction and a second display direction which is a reversed direction to the first display direction and displays an image by receiving a second display video signal and performing a scanning;

a video signal processing unit that executes a predetermined signal processing for the video signal obtained based on a captured image;

a scanning direction instructing unit that instructs the second image display unit to execute a normal scanning in a first state corresponding to the first display direction and execute a reversed scanning by reversing a corresponding scanning direction to a movement direction of the second image display unit to reverse an image from the first display direction to the second display direction in a second state corresponding to the second display direction;

a first color specifying unit that specifies a color of a graphics image corresponding to the first image display unit;

a second color specifying unit that specifies a color of a graphics image corresponding to the second image display unit;

a first position specifying unit that specifies a position of the graphics image to be synthesized with an image of the video signal corresponding to the first image display unit;

a second position specifying unit that specifies a position of the graphics image to be synthesized with an image of the video signal corresponding to the second image display unit in such a way that a normal position is specified without horizontal reversing in the first state and a reversed position is specified by horizontally reversing in the second state;

a first synthesizing unit that outputs, as the first display video signal, a signal obtained by synthesizing a signal of a color stored when the first color specifying unit specifies a color with the video signal input from the video signal processing unit at a position specified by the first position specifying unit; and a second synthesizing unit that outputs, as the second display video signal, a signal obtained by synthesizing a signal of a color stored when the second color specifying unit specifies a color with the video signal input from the video signal processing unit at a position specified by the second position specifying unit.

* * * * *